(12) United States Patent
Tsujimoto et al.

(10) Patent No.: US 7,880,422 B2
(45) Date of Patent: Feb. 1, 2011

(54) IMAGE FORMING APPARATUS APPROPRIATELY SETTING CURRENT VALUE FOR DRIVING MOTOR

(75) Inventors: Takahiro Tsujimoto, Toyokawa (JP); Katsuhide Sakai, Toyokawa (JP); Kouji Ohara, Toyohashi (JP); Shinichi Yabuki, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 323 days.

(21) Appl. No.: 12/050,313

(22) Filed: Mar. 18, 2008

(65) Prior Publication Data

US 2008/0231220 A1  Sep. 25, 2008

(30) Foreign Application Priority Data

Mar. 22, 2007 (JP) .............................. 2007-074476
Mar. 30, 2007 (JP) .............................. 2007-093596

(51) Int. Cl.
*G05B 19/40* (2006.01)
(52) U.S. Cl. .................... 318/685; 318/696; 318/432
(58) Field of Classification Search ................ 318/685, 318/696, 432, 433, 434, 567, 569; 399/119; 347/171; 400/322
See application file for complete search history.

(56) References Cited

U.S. PATENT DOCUMENTS 4,693,595 A  9/1987  Kunikawa et al.

| 2001/0035730 A1 | 11/2001 | Yoshikawa et al. |
| 2003/0235450 A1 | 12/2003 | Okamoto et al. |
| 2008/0278561 A1 * | 11/2008 | Mindler et al. ............. 347/171 |

FOREIGN PATENT DOCUMENTS

| EP | 0 602 343 | 6/1994 |
| JP | 56-070583 U | 11/1980 |
| JP | 04-083268 | 3/1992 |
| JP | 07-67016 A | 3/1995 |
| JP | 11-180003 A | 7/1999 |
| JP | 11-215890 A | 8/1999 |
| JP | 2001-125436 A | 5/2001 |
| JP | 2001-158546 | 6/2001 |
| JP | 2002-072773 | 3/2002 |
| JP | 2004-350386 | 12/2004 |
| JP | 2005-073442 | 3/2005 |

OTHER PUBLICATIONS

European Search Report in Application 08005123.8-2209 dated Jul. 31, 2008.
Notice of Grounds of Rejection in JP 2007-074476 dated Jan. 20, 2009, and an English Translation thereof.
Notice of Grounds of Rejection in JP 2007-093596 dated Jan. 27, 2009, and an English Translation thereof.

* cited by examiner

*Primary Examiner*—Karen Masih
(74) *Attorney, Agent, or Firm*—Buchanan Ingersoll & Rooney PC

(57) ABSTRACT

When a printing instruction is provided, a CPU causes a stepping motor M to drive a developer and calculates the value of a load of the stepping motor M before printing operations are performed. Then, CPU determines whether the value of the load is within a predetermined range stored in advance. If the value is not within the predetermined range, CPU causes a display to display an error message.

25 Claims, 19 Drawing Sheets

IMAGE FORMING APPARATUS APPROPRIATELY SETTING CURRENT VALUE FOR DRIVING MOTOR

This application is based on Japanese Patent Applications Nos. 2007-074476 and 2007-093596 filed with the Japan Patent Office on Mar. 22, 2007 and on Mar. 30, 2007, respectively, the entire content of which is hereby incorporated by reference.

BACKGROUND OF THE INVENTION

1. Field of the Invention

The present invention relates to an image forming apparatus, and particularly to an image forming apparatus using a stepping motor for a drive mechanism.

2. Description of Related Art

In image forming apparatuses such as copiers, printers, and multifunction peripherals (MFPs), a stepping motor is used as the drive source, in some cases. In such image forming apparatuses, a constant-current drive system (hereinafter referred to as a "constant-current system") is employed as a system for controlling a stepping motor in many instances. In the constant-current system, at the start of driving, a relatively high voltage is applied to a stepping motor until a target current flows. When the current flowing in the stepping motor attains the target current, then pulse width modulation (PWM) control is performed to maintain the target current. That is, in the constant-current system, after the current flowing in the stepping motor attains the target current, the current is continuously monitored, and control to maintain the target current is performed. For the control to maintain the target current, a switching system of rapidly repeating on/off operations for applying voltage is employed.

Regarding image forming apparatuses as mentioned above, various techniques have been hitherto disclosed.

For example, Japanese Laid-Open Patent Publication No. 07-067016 discloses a technique that, in an image processing apparatus, corrects the rotary torque of a motor into an optimum state using the rotation speed and the rotation direction of the motor as parameters.

Japanese Laid-Open Patent Publication No. 11-180003 discloses a technique that, in an image forming apparatus, detects change in the rising of a drive current for a motor and counts the number of chopping of the drive current to detect the conditions of rotation of the motor, and controls the drive current based on the detected conditions.

Note that, in image forming apparatuses, various sensors are provided in addition to such motors to detect paper jam in a paper feed mechanism, the presence or absence of an ink cartridge attached in an image forming unit, and so forth.

As the aforementioned target current, a current is set which is anticipated in the case where the load on a portion with which the stepping motor is used is maximum. This is intended to ensure operations without causing step out of the motor even when the load on the above portion is maximum. Note that the step out refers to a phenomenon in which when the cycle of pulse signals of a drive voltage provided to a stepping motor becomes too short, operations of the rotor of the stepping motor cannot follow such a cycle, with the result that the rotor does not rotate normally.

The setting of the constant-current value mentioned above is specifically described with reference to the drawing.

FIG. 24 is a graph showing the relationship between changes over time of the load torque required for driving a stepping motor and the constant-current value to be set. With reference to FIG. 24, the load torque increases with time as indicated by the line A. The load on a portion with which the stepping motor is used is maximized at the initial stage in use, where continuous printing operations is carried out for a predetermined time, and in specific environments or a combination of these conditions. In the conventional constant-current system, to ensure operations of the motor without causing the step out of the motor even when an image forming apparatus is in such conditions as described above and the load torque is maximized, or even when a change occurs suddenly to temporarily increase the load torque, the constant-current value in accordance with the maximum load torque, as indicated by the line B, is set.

When the image forming apparatus is not in the conditions as described above, that is, in most of the times during which the image forming apparatus is driven, the load is not maximum as shown in FIG. 24. During such a time, the stepping motor operates with the current setting that causes excessive motor output with respect to the load torque required.

If the motor output is excessive with respect to the load, surplus energy is produced in addition to the required energy. The surplus energy increases the vibration of the stepping motor. As a result, there arises a problem that the noise generated when the image forming apparatus is driven becomes large.

The motor output is excessive in most of the times during which the image forming apparatus is driven, and therefore there is also a problem that energy is excessively consumed in the image forming apparatus.

Further, heat generation in the stepping motor and the drive power source increase because of generation of surplus energy, and therefore there is also a problem that a cooling mechanism is sometimes needed.

Further, in an image forming apparatus as described above, reduction in manufacturing costs is thought much of, just as for generally-used devices, and there is a demand for making the image forming apparatus have as few components as possible to promote downsizing.

SUMMARY OF THE PRESENT INVENTION

The present invention has been made in view of these problems. It is one of the objects of the present invention that, in an image forming apparatus in which a stepping motor, driving of which is controlled in a constant-current system, is mounted, a current that causes an optimum motor output with respect to a load required for the image forming apparatus is set while the foregoing control is performed. Further, it is one of the objects of the present invention to reduce costs for manufacturing the image forming apparatus and reduce the size of the apparatus.

To achieve the above objects, an image forming apparatus according to one aspect of the present invention includes a stepping motor; a motor driving part supplying power to the stepping motor for driving the stepping motor; a detector detecting a condition change regarding a load on the stepping motor when changing the power supplied to the stepping motor by the motor driving part; and a controller performing control of the image forming apparatus based on the condition change.

An image forming apparatus according to another aspect of the present invention includes: a stepping motor, a motor driver circuit supplying a current to the stepping motor up to a first current value to drive the stepping motor, a detector detecting from the motor driver circuit a voltage corresponding to the current supplied to the stepping motor; a memory storing a threshold used for performing, based on a change of the voltage, determination of a relational type between a load torque required for driving the stepping motor and an output of the stepping motor to be driven with the first current value; and a controller changing the first current value to a second current value calculated as a result of performing the determination using the threshold.

An image forming apparatus according to another aspect of the present invention is an image forming apparatus forming an image on a sheet of paper, which includes a member driven when forming an image; a stepping motor driving the member; a controller controlling supply of power for driving the member to the stepping motor, a memory storing information on a load of the stepping motor; and a display displaying information, and the controller supplies power to the stepping motor for driving the member, calculates a load for driving the member of the stepping motor based on a drive current waveform for the stepping motor, and controls the display based on a result of comparison of the calculated load with information stored in the memory.

An image forming apparatus according to another aspect of the present invention is an image forming apparatus forming an image on a sheet of paper, which includes: a member driven at the time of forming an image, a stepping motor for driving the member; a controller controlling supply of power for driving the member to the stepping motor; and a memory storing information on a load of the stepping motor, and the controller supplies power to the stepping motor for driving the member, calculates a load for driving the member of the stepping motor based on a drive current waveform for the stepping motor, and determines a state of the member based on a result of comparison of the calculated load with information stored in the memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
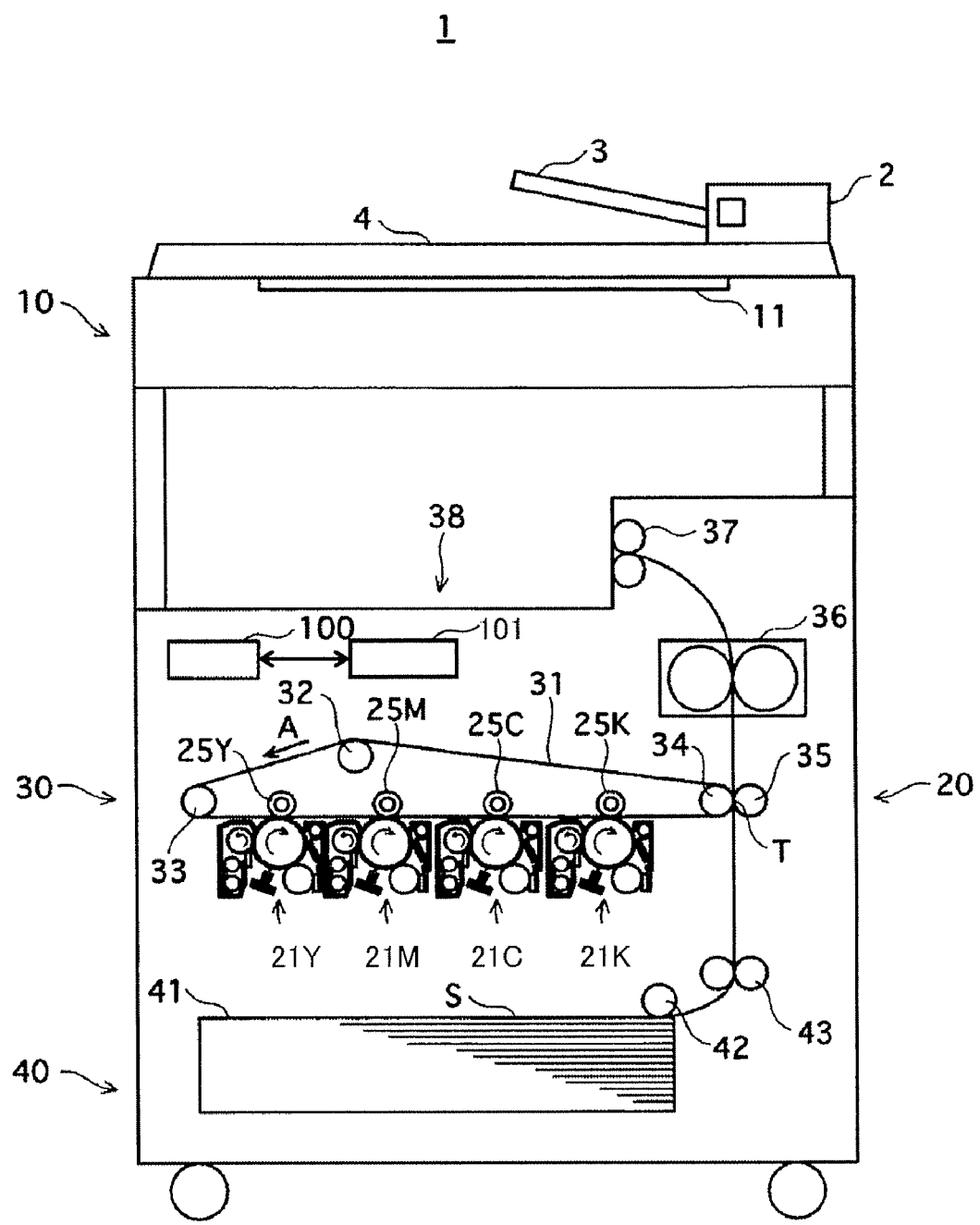
FIG. 1 schematically shows a longitudinal section of a copier that is a first embodiment of an image forming apparatus of the present invention.

Embodiments of the present invention will be described below with reference to the drawings. In the description hereinafter, the same components and elements are indicated by the same reference characters. Their names and functions are also the same unless otherwise stated.

First Embodiment

In a first embodiment, description is given on a case where an image forming apparatus according to the present invention is applied as a digital color copier (hereinafter referred to as a "copier") of a tandem system. However, the image forming apparatus according to the present invention is not limited to copiers. The image forming apparatus according to the present invention may be a printer, a facsimile machine, or an MFP, which is a multifunctional machine having functions of these machines, as long as they are image forming apparatuses using a stepping motor for a drive mechanism. The printing system is not limited to the tandem system, and further is not limited to the digital system. Moreover, the apparatus may be a monochrome machine instead of the color machine.

An image forming apparatus of a color tandem system is configured such that four color image forming parts each including a developer aligned along an intermediate transfer belt. The intermediate transfer belt is an intermediate transfer member that carries toner images formed in the image forming parts. A toner image of each color formed in each image forming part is transferred to the intermediate transfer belt. This is referred to as a "primary transfer". Toner images having respective colors are superimposed on one another to form a multicolor image. Further, the image superimposed on one another on the intermediate transfer belt is transferred onto paper, which is a printing medium. This is referred to as a "secondary transfer" The paper on which the image has been transferred is outputted after the fixing process.

FIG. 1 schematically shows a longitudinal section of a copier 1, which is the first embodiment of an image forming apparatus of the present invention. Copier 1 is a digital color copier of a tandem system. In copier 1, toners of four colors, i.e., yellow (Y), magenta (M), cyan (C), and black (K), are sequentially superimposed on one another, so that a color image is formed.

With reference to FIG. 1, copier 1 according to the first embodiment includes an image reading part 10, a paper conveying part 20, an image formation part 30, and a paper storage part 40.

Image reading part 10 includes a placement plate 3 for setting a document, a document base plate glass 11, a conveyer 2 that automatically conveys the document set on placement plate 3 sheet by sheet onto the document base plate glass 11, and a ejection plate 4 for discharging the read document. Further, image reading part 10 includes a scanner (not shown). The scanner moves in parallel to document base plate glass 11 by a scan motor. The scanner includes an exposure lamp that illuminates a document, a reflection mirror that changes the direction of the reflected light from the document, a mirror that changes the optical path from the reflection mirror, a lens that collects the reflected light, and three rows (R, G, B) of photoelectric conversion elements, such as charge coupled devices (CCDs), that generate electric signals in accordance with the received reflected light.

The document conveyed by conveyer 2 is set on document base plate glass 11. When the scanner moves in parallel to document base plate glass 11, the document is exposed to light and scanned. The reflected light from the document is converted to electric signals by the photoelectric conversion elements and is inputted into image formation part 30.

Image formation part 30 includes an intermediate transfer belt 31, an image forming part 21, a transfer roller 25, a fixer 36, a controller 100, and a memory 101.

Intermediate transfer belt 31 is an endless belt and is suspended by a plurality of rollers 32, 33, and 34 without sagging. These rollers each rotate counterclockwise in the arrow A direction in FIG. 1, so that the rollers as a whole rotate in the same direction at a predetermined speed.

Image forming part 21 represents image forming parts 21Y, 21M, 21C, and 21K corresponding to color toners of yellow (Y), magenta (M), cyan (C), and black (K), respectively. Image forming parts 21Y, 21M, 21C, and 21K are disposed in this order along intermediate transfer belt 31 at predetermined intervals. Image forming part 21 includes a developer and a photosensitive body.

Transfer roller 25 represents transfer rollers 25Y, 25M, 25C, and 25K corresponding to color toners of yellow (Y). 1 magenta (M), cyan (C), and black (K), respectively. Each transfer roller 25 pairs up with a photosensitive body (Photo Conductor) included in each corresponding image forming part 21 with intermediate transfer belt 31 pinched therebetween.

After a toner image transferred onto intermediate transfer belt 31 is transferred onto a sheet of paper, fixer 36 fixes the toner image on the sheet of paper.

Controller 100 includes a central processing unit (CPU) 13 (see FIG. 2) and the like, and programs to be executed in controller 100, data utilized for executing the programs, and the like are stored in memory 101.

Paper storage part 40 includes a paper feed cassette 41 that contains a sheet S of paper, which is a printing medium. Paper conveying part 20 includes rollers 42, 43, 35, and 37 for conveying sheet S of paper from paper feed cassette 41, and a paper ejection tray 38 that ejects a printed sheet of paper.

Controller 100 reads out a program from memory 101 based on instruction signals inputted from an operation panel (not shown) and the like and controls the foregoing parts. Controller 100 may include a time register such as a timer inside and execute a program when a predetermined time is measured. Note that controller 100 and memory 101 may be included in image reading part 10 and paper conveying part 20 other than image formation part 30.

Controller 100 executes the program to perform predetermined image processing for image signals inputted from a device such as image reading part 10 and an external device. Digital signals color-converted to colors of yellow, magenta, cyan, and black are thus produced. Image color data for cyan, image color data for magenta, image color data for yellow, and image color data for black created by controller 100 for forming the image are outputted from controller 100 to exposure devices of image forming part 21 corresponding to each color.

The exposure device outputs laser beams to a photosensitive body based on image data inputted from controller 100. By the laser beams, the surface of the photosensitive body that has been uniformly charged is exposed in accordance with the image data to form an electrostatic latent image. A developing bias voltage is applied to a developing roller. A potential difference is therefore generated between the developing roller and the electrostatic latent image potential on the photosensitive body. In this state, charged toner is supplied to form a toner image on the surface of the photosensitive body. The toner image formed on the surface of the photosensitive body is transferred onto intermediate transfer belt 31, which is an image carrier, by transfer roller 25 of a constant voltage or a constant current. This is referred to as a "primary transfer".

The toner image primarily transferred onto intermediate transfer belt 31 is transferred onto sheet S of paper conveyed from paper feed cassette 41 by roller 34. This is referred to as a "secondary transfer" The toner image that has been secondarily transferred on the sheet of paper is fixed on the sheet of paper by fixer 36 and is ejected as an electrophotographic image to paper ejection tray 38.

In copier 1 according to the first embodiment, a stepping motor can be used for a mechanism that drives photosensitive bodies in image forming part 21 and various rollers, a mechanism that drives fixer 36, a mechanism that drives rollers 42, 43, 35, and 37 of paper conveying part 20 in the configuration described above. In the present invention, the stepping motor is not limited regarding the drive mechanism for which the stepping motor is used, and may be used in any drive mechanism. The stepping motor may also be used in other mechanisms. In the embodiments, it is assumed that the stepping motor to be used is of a two-phase bipolar type.

Figure 2:
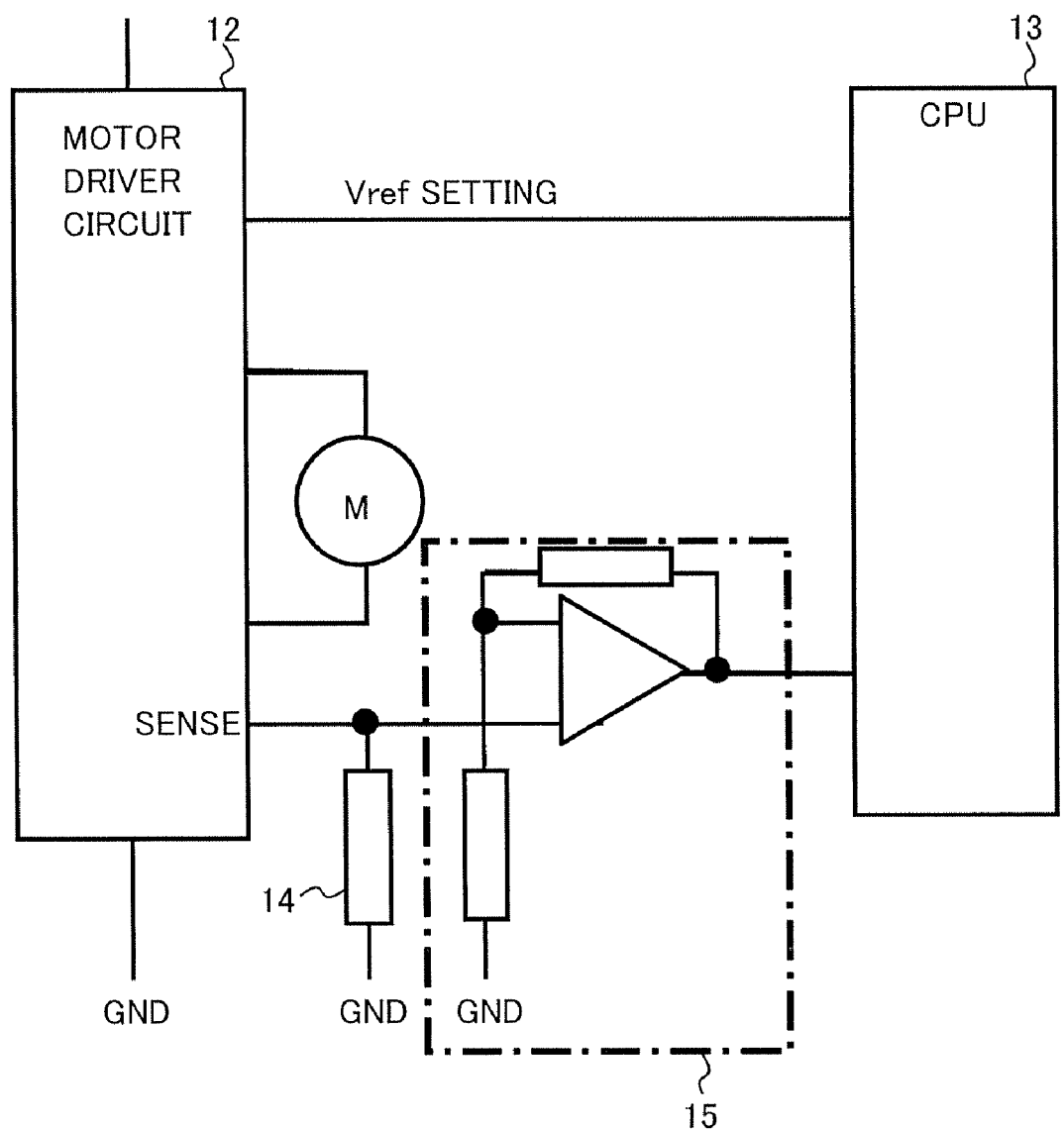
FIG. 2 shows a specific example of an equivalent circuit diagram of a drive circuit for controlling driving of a stepping motor of the copier according to the first embodiment.

In copier 1, driving of the stepping motor is controlled by the constant-current system described above. FIG. 2 shows a specific example of an equivalent circuit diagram of a drive circuit for controlling driving of the stepping motor. This is a specific example of a circuit diagram of a drive circuit of a stepping motor of a two-phase bipolar type.

With reference to FIG. 2, an input terminal of a motor driver circuit 12 connected to a stepping motor M is also connected to a CPU 13. Motor driver circuit 12 outputs excitation signals to stepping motor M in accordance with control signals from CPU 13 to control the driving (rotation) of stepping motor M. The torque of stepping motor M is set by changing a voltage at a Vref terminal of motor driver circuit 12. Note that while a circuit configuration in which the voltage at Vref terminal of motor driver circuit 12 is set by control signals from CPU 13 is shown in FIG. 2, a configuration in which the voltage is set by voltage dividing with a resistor may be used.

One end of an output terminal of motor driver circuit 12 is grounded (GND). A sense terminal, which is the other end of the output terminal of motor driver circuit 12, is connected through a current sensing resistor 14 and an amplifier circuit 15 to CPU 13. With this circuit configuration, a current in accordance with a voltage difference (Vref potential) between a voltage at Vref terminal and the grounded terminal is supplied to stepping motor M. A voltage between sense terminal and the grounded terminal, that is, a potential at sense terminal, which is determined by a current flowing from sense terminal and current sensing resistor 14, is detected in CPU 13. By detecting a change in potential at sense terminal in CPU 13, changes of a current flowing in stepping motor M can be detected.

Figure 3:
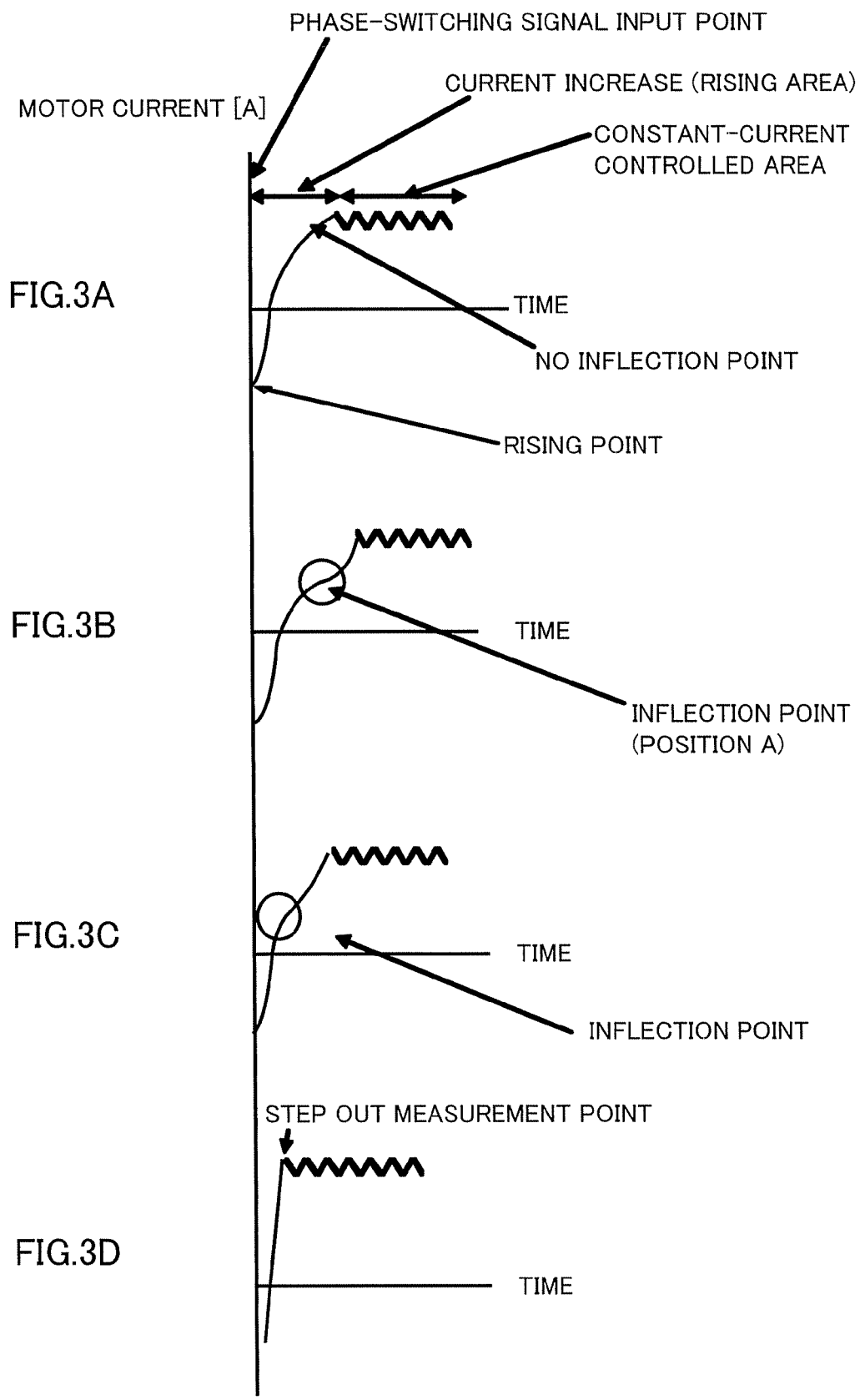
FIGS. 3A to 3D are diagrams for describing the relationship between an inflection point in the voltage waveform of the stepping motor and the motor output at a constant-current value currently set for a load torque required for driving the stepping motor in a copier 1.

Referring to FIG. 3A, changes in increase/decrease rate of a current flowing in stepping motor M (hereinafter referred to as a "motor current") will be described.

With reference to FIG. 3A, when excitation signals are newly inputted, or excitation signals are switched from the phase currently excited to other phase and they are inputted, from motor driver circuit 12 to stepping motor M, a current starts to flow through a motor coil to increase the motor current (corresponding to a "rising area" in FIG. 3A).

Upon detecting that the motor current has increased to a set current, CPU 13 outputs control signals to motor driver circuit 12 to cause motor driver circuit 12 to output excitation signals of repeating switching on and off of the motor current. As a result, as shown as a "constant-current controlled area" in FIG. 3A, the motor current is maintained at the set current.

In the motor current waveform, the point where the current value starts to rise with excitation signals newly inputted, or excitation signals switched from the phase currently excited to other phase and inputted is referred to as a "rising point". An area where the current increases from the rising point to the set value is referred to as a "rising area". An area where the current is maintained to the set value is referred to as a "constant-current controlled area".

It is known that the increase/decrease rate of the rising area has the following tendency. Immediately after excitation signals are inputted, the increase/decrease rate (increase rate) of the motor current is low. Thereafter, the increase/decrease rate gradually increases. The increase/decrease rate becomes low as the current value approaches the constant-current controlled area. Note that, in the examples shown in FIGS. 3A to 3D, the increase/decrease rate is positive, indicating the increase rate. However, depending on characteristics of stepping motor M and the load torque required for driving stepping motor M, the increase/decrease rate may be negative, indicating the decrease rate.

Referring to FIGS. 3A to 3D, further description is given on the relationship between the above-described point where the increase/decrease rate that has risen falls and the motor output at the constant-current value currently set for a load torque required for driving the stepping motor in the apparatus. The point at which the increase/decrease rate changes in the rising area (the rising increase/decrease rate temporarily falls) is referred to as an "inflection point".

If the motor output at the constant-current value currently set is large for the load torque required for driving the stepping motor in copier 1, in other words, if the required load torque is low for the motor output at the constant-current value currently set, an inflection point occurs at a position closer to the rising point than to the constant-current controlled area as shown in FIG. 3C. That is, the inflection point occurs at a time closer to a starting time of driving than to the middle of the starting time of driving and a starting time of the constant-current controlled area.

If the motor output at the constant-current value currently set is appropriate for the load torque required in copier 1, in other words, if the required load torque is higher for the motor output at the constant-current value currently set than the state shown in FIG. 3C, the inflection point occurs, as shown in FIG. 3B, at a time closer to the constant-current controlled area than the time shown in FIG. 3C.

If the motor output at the constant-current value currently set is small for the load torque required in copier 1, that is, if the required load torque is further higher for the motor output at the constant-current value currently set than the state shown in FIG. 3B, the inflection point is nearer to the constant-current controlled area than the position shown in FIG. 3B. That is, the inflection point appears at a later time. Accordingly, if the required load torque is too high for the motor output at the constant-current value currently set, an inflection point does not occur until the current waveform arrives at the constant-current controlled area as shown in FIG. 3A.

In addition, if the motor output at the constant-current value currently set is extremely small for the load torque required in copier 1, that is, if the required load torque is further higher for the motor output at the constant-current value currently set than the state shown in FIG. 3A, the time taken for the current waveform to arrive at the constant-current controlled area from the rising point is reduced, as shown in FIG. 3D. This shows a state where the motor output at the constant-current value currently set is too small for the required load torque in copier 1. That is, this shows that driving the motor with the motor output under the current setting of the constant-current value is not appropriate for the required load torque. This can be said as motor driving without reliability.

In copier 1 according to the first embodiment, due to the relationship of the inflection point and the motor output at the constant-current value currently set for the load torque required in the apparatus as described above, the set value of the constant current is changed in accordance with the load torque required for driving the stepping motor in copier 1 at a predetermined timing, with the focus on the position of occurrence of an inflection point in the rising area.

Figure 4:
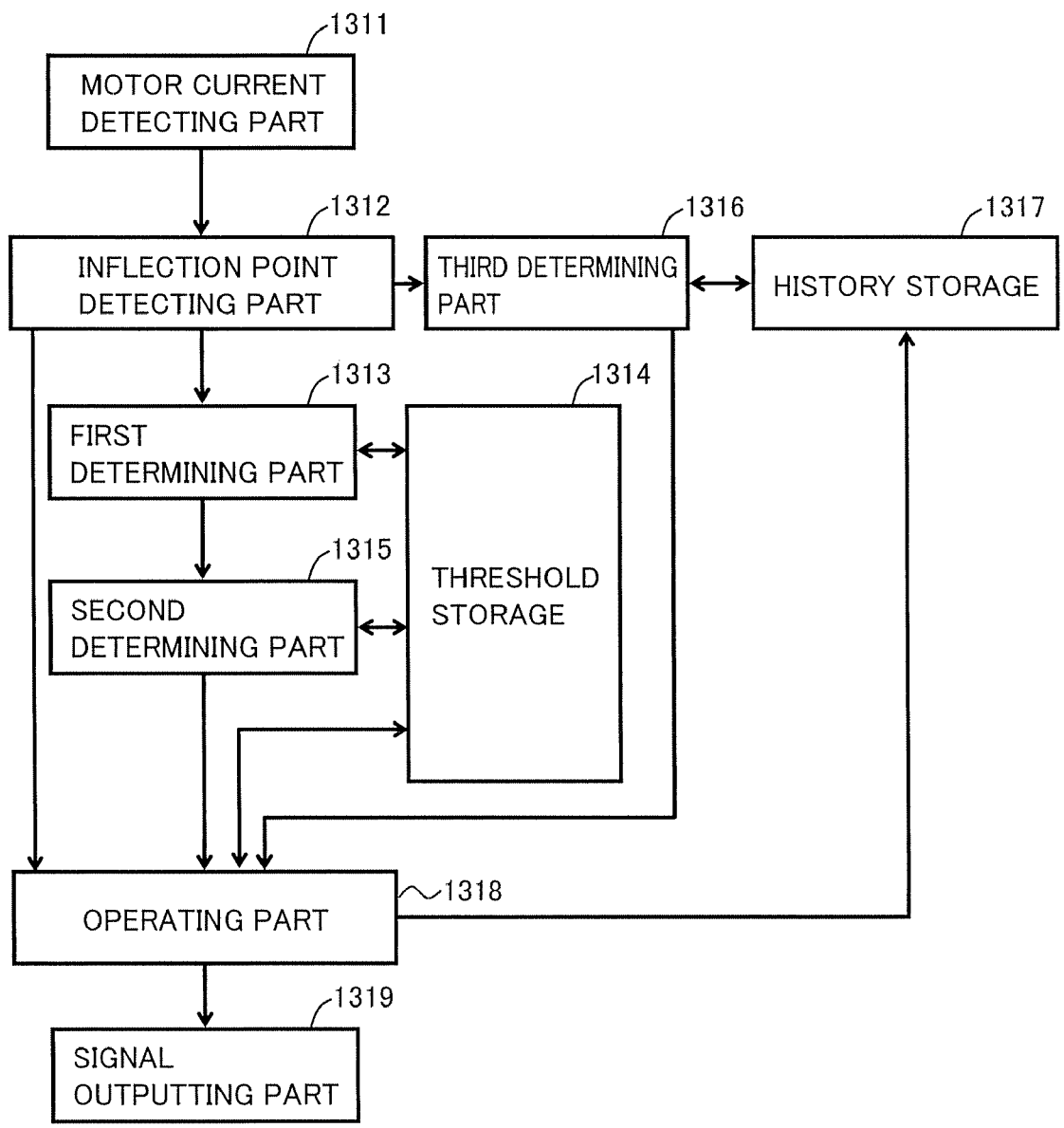
FIG. 4 is a block diagram showing a specific example of the functional configuration for changing the set value of the constant current in the copier according to the first embodiment.

FIG. 4 is a block diagram showing a specific example of the functional configuration for changing the set value of the constant current in copier 1 according to the present embodiment. CPU 13 reads programs from memory 101 and executes them, whereby the functions shown in FIG. 4 are formed mainly in CPU 13. At least part of the functions may be formed by the hardware configuration shown in FIG. 1.

With reference to FIG. 4, functions for changing the set value of the constant current in copier 1 are configured including a motor current detecting part 1311, an inflection point detecting part 1312, a first determining part 1313, a threshold storage 1314, a second determining part 1315, a third determining part 1316, a history storage 1317, an operating part 1318, and a signal outputting part 1319.

Motor current detecting part 1311 detects a voltage between sense terminal and the grounding point in motor driver circuit 12, that is, a potential at sense terminal by means of the configuration connected through amplifier circuit 15 to sense terminal of motor driver circuit 12 shown in FIG. 2. The detected voltage is inputted into inflection point detecting part 1312. Inflection point detecting part 1312 detects an inflection point of the waveform of the voltage. As shown in FIG. 2, a current flown out from sense terminal of motor driver circuit 12 corresponds to a current that is supplied to stepping motor M. Accordingly, the voltage waveform caused by potential change at sense terminal is approximately the same as the waveform of the motor current. The detected result of the inflection point is inputted into first determining part 1313 and operating part 1318 or third determining part 1316.

Threshold storage 1314 is constructed mainly in memory 101 and the like and stores a threshold used for determining whether the position of an inflection point is appropriate. First determining part 1313 determines, using a threshold stored in threshold storage 1314, whether, when an inflection point is detected from the voltage waveform corresponding to the waveform of the motor current in inflection point detecting part 1312, the position of the detected inflection point is appropriate. The result of the determination is inputted into second determining part 1315. For example, when an inflection point is detected at the position shown in FIG. 3B, first determining part 1313 determines that the position of the inflection point is appropriate. If the inflection point is detected at a position closer to the constant-current controlled area than the position shown in FIG. 3B and if the inflection point is detected at the position shown in FIG. 3C, first determining part 1313 determines that the position of the inflection point is not appropriate. That is, a threshold stored in threshold storage 1314 is a position of an inflection point A that occurs in the waveform of a motor current when the motor output is appropriate for the load required for driving the stepping motor in copier 1. The position of inflection point A described above, which is the threshold, is referred to as an "aim position NA". The threshold or aim position NA is defined for the load required in copier 1. The threshold may be stored in advance in threshold storage 1314. Alternatively, setting operations may be accepted in an operation panel (not shown) and the threshold may be stored in threshold storage 1314 based on operation signals from the operation panel.

Specifically, aim position NA can be determined as follows. That is, given that the set value of the constant current that is currently set is a value Is, and that the safety factor for the load required in copier 1 is a safety factor H1 (e.g., 10%), aim position NA can be determined as the position of an inflection point in such a current waveform that the current value in the constant-current controlled area is Is/H1 (1.1 when the safety factor is 10%).

Alternatively, operations of setting the position of an inflection point calculated in this way as aim position NA may be accepted at the operation panel (not shown), and the threshold may be stored in threshold storage 1314 based on operation signals from the operation panel. Operations of setting safety factor H1 are accepted, and, based on that safety factor H1, aim position NA is calculated using necessary parameters stored in advance and may be stored in threshold storage 1314. Where the position of the inflection point for the load required in copier 1 should be placed so that stepping motor M can be stably driven (rotated) with the motor output of the voltage waveform can be designed by a designer as needed, depending on the characteristics of the load, that is, whether the configuration allows for a sudden change of the load during the driving of stepping motor M at a certain speed.

If it is determined in first determining part 1313 that the position of the inflection point is not appropriate, then second determining part 1315 determines whether the motor output is large or small for the load torque required in copier 1. That is, second determining part 1315 determines using the relationship of the inflection point and the motor output for the load torque required in the apparatus, which is shown in FIGS. 3A and 3C, whether the position of an inflection point that is a threshold stored in threshold storage 1314 is at a position closer to the constant-current controlled area or a position closer to the rising point than aim position NA. The result of the determination is inputted into operating part 1318.

History storage 1317 is constructed mainly in memory 101 and the like and stores histories of change of the set value of constant current in a constant-current drive system to be described later.

If an inflection point is not detected from the motor current in inflection point detecting part 1312, then third determining part 1316 determines whether there is a history of increasing the set value in the past by referring to the above-mentioned histories stored in history storage 1317. Then, in accordance with the result of the determination, third determining part 1316 inputs the result of the determination into operating part 1318. Alternatively, third determining part 1316 determines that the step out occurs.

Based on the result of the determination inputted from second determining part 1315 or the result of the determination inputted from third determining part 1316, operating part 1318 calculates a value to which the set value is to be changed using a threshold stored in threshold storage 1314 and the result of the detection of the inflection point inputted from inflection point detecting part 1312. The result is inputted into signal outputting part 1319.

Signal outputting part 1319 outputs to motor driver circuit 12 control signals for changing the set value in accordance with the result of the arithmetic operation that has been inputted. Changing the set value in this way is stored as a history in history storage 1317.

Figure 5:
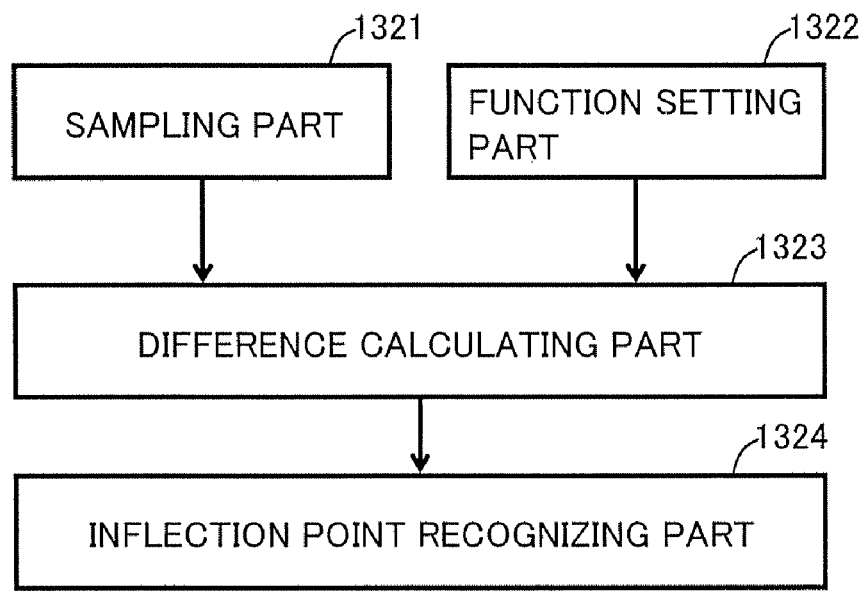
FIG. 5 is a block diagram showing a specific example of the configuration of an inflection point detecting part of FIG. 4.
Figure 7:
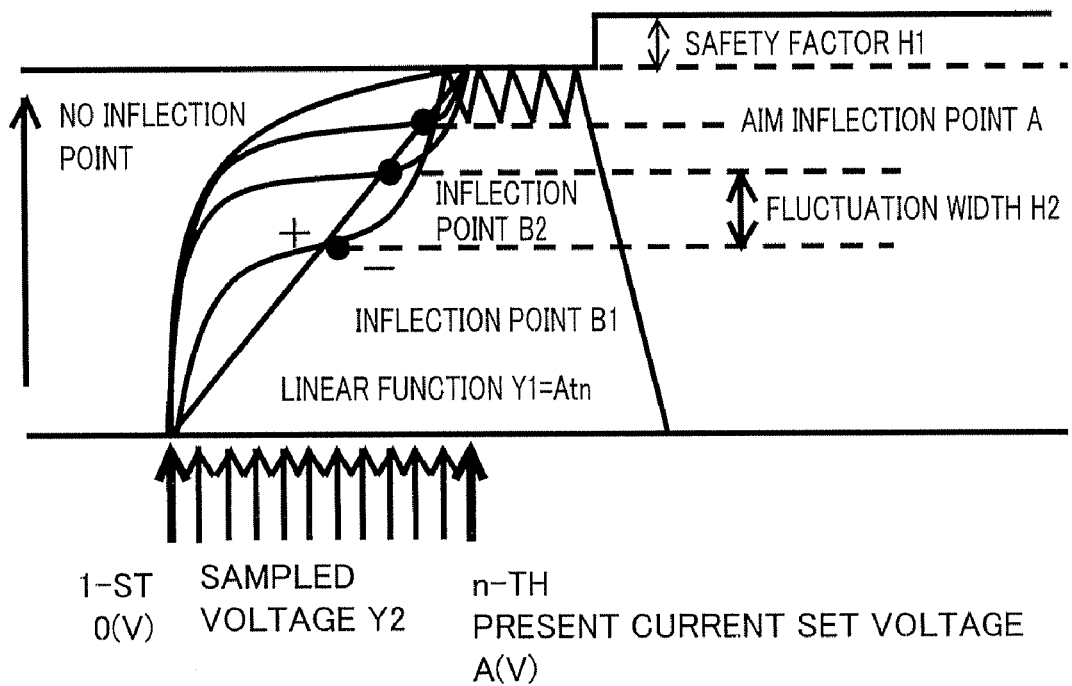
FIG. 7 is a diagram for describing a method for detecting an inflection point.

FIG. 5 is a block diagram showing a specific example of the more detailed configuration of inflection point detecting part 1312. FIG. 7 is a diagram for describing a method for detecting an inflection point, and shows a specific example of the voltage waveform.

With reference to FIG. 5, inflection point detecting part 1312 is configured including a sampling part 1321, a function setting part 1322, a difference calculating part 1323, and an inflection point recognizing part 1324.

Function setting part 1322 calculates a coefficient A (gradient) in a linear function from the rising point to the constant-current controlled area with the set constant-current value, using the constant-current value (target current) being set and the time from the rising point to the arrival at the constant-current controlled area detected in the previous detection of the motor current, which is stored in history storage 1317. Function setting part 1322 sets a linear function $Y1(n) = A*t(n)$ shown in FIG. 7. Note that t(n) refers to a time from the rising point to the arrival at the constant-current controlled area.

Sampling part 1321 samples the voltage between sense terminal and the grounded point in the rising area from the rising point to the arrival at the constant-current controlled area of the voltage waveform n times at predetermined time intervals from voltages detected in motor current detecting part 1311. The sampled voltage value is denoted by Y2($n$).

Difference calculating part 1323 calculates a difference D(n) between the voltage value Y2($n$) sampled in sampling part 1321 and linear function Y1($n$) set in function setting part 1322. The result is inputted into inflection point recognizing part 1324.

Inflection point recognizing part 1324 compares differences D(n) of n calculations with one another. Then, inflection point recognizing part 1324 recognizes, as an inflection point B, a point with a difference D(n) of 0 or a point at which difference D(n) changes from positive to negative or from negative to positive. A position NB of the recognized inflection point B is inputted into first determining part 1313 and operating part 1318. Alternatively, if difference D(n) is always 0 or if the positive and negative of the difference D(n) does not change, inflection point recognizing part 1324 inputs to that effect into third determining part 1316.

Figure 6:
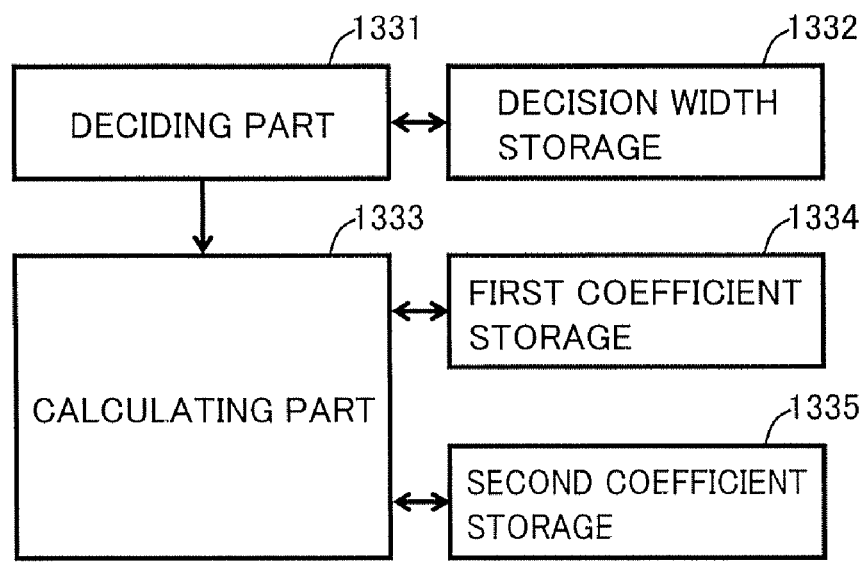
FIG. 6 is a block diagram showing a specific example of the configuration of an operating part of FIG. 4.

FIG. 6 is a block diagram showing a specific example of the more detailed configuration of operating part 1318. With reference to FIG. 6, operating part 1318 is configured including a deciding part 1331, a decision width storage 1332, a calculating part 1333, a first coefficient storage 1334, and a second coefficient storage 1335.

Decision width storage 1332 is constructed mainly in memory 101 and the like and stores a decision width as a threshold used for deciding whether, when a voltage value corresponding to a motor current is sampled a plurality of times, the maximum value, the minimum value, and the difference of the voltage value at the detected inflection point are within a predetermined range. This decision width may be stored in advance in decision width storage 1332. The decision width may also be determined by an experiment. In the latter case, setting operations may be accepted at the operation panel (not shown), and the threshold may be stored in decision width storage 1332 based on operation signals from the operation panel.

Deciding part 1331 calculates a difference H2 between the maximum and the minimum of a voltage value at an inflection point detected with the results obtained by performing sampling a plurality of times, which inflection point has been inputted from inflection point detecting part 1312. Then, deciding part 1331 decides, by comparing difference H2 with the above-mentioned decision width, whether difference H2 is within the decision width. The result of the decision is inputted into calculating part 1333.

First coefficient storage 1334 and second coefficient storage 1335 are constructed mainly in memory 101 and the like, and each stores a first coefficient K1 and a second coefficient K2 used for an arithmetic operation in calculating part 1333 to be described later. First coefficient K1 is increase/decrease coefficient and is a coefficient determined based on the above-described safety factor H1. Coefficient K1 may be stored in advance in first coefficient storage 1334. Setting operations may be accepted at the operation panel (not shown), and coefficient K1 may be stored in first coefficient storage 1334 based on operation signals from the operation panel. Alternatively, the correspondence relationship between safety factor H1 and coefficient K1 is stored on first coefficient storage 1334, and coefficient K1 may be automatically set based on safety factor H1. Second coefficient K2 is an increase/decrease coefficient and is a coefficient used in accordance with fluctuations of the load required in copier 1 when the fluctuations are large, that is, a coefficient that is determined based on difference H2. Coefficient K2 may also be stored in advance in second coefficient storage 1335. Setting operations may be accepted at the operation panel (not shown), and coefficient K2 may be stored in second coefficient storage 1335 based on operation signals from the operation panel. Alternatively, the correspondence relationship between difference H2 and coefficient K2 is stored on second coefficient storage 1335, and coefficient K2 may be automatically set based on difference H2.

Calculating part 1333 calculates, in accordance with the result of the decision inputted from deciding part 1331, a set value I to which the current value is to be changed, based on value Is of the constant current that is currently set. Specific examples of the arithmetic equation used in calculating part 1333 include the following arithmetic equations (1) and (2).

That is, when it is decided in deciding part 1331 that difference H2 is within the decision width, $$I = Is - (VA - VB) \times K1 \qquad \text{arithmetic equation (1),}$$

and when it is not decided in deciding part 1331 that difference H2 is within the decision width, $$I = Is - (VA - VB) \times K1 \times K2 \qquad \text{arithmetic equation (2)}$$

where

Is is a constant-current value that is currently set,

VA is a voltage value at inflection point A that is aim position NA,

VB is a voltage value at inflection point B that is position NB, and

K1 and K2 refer to increase/decrease coefficients.

Figure 8:
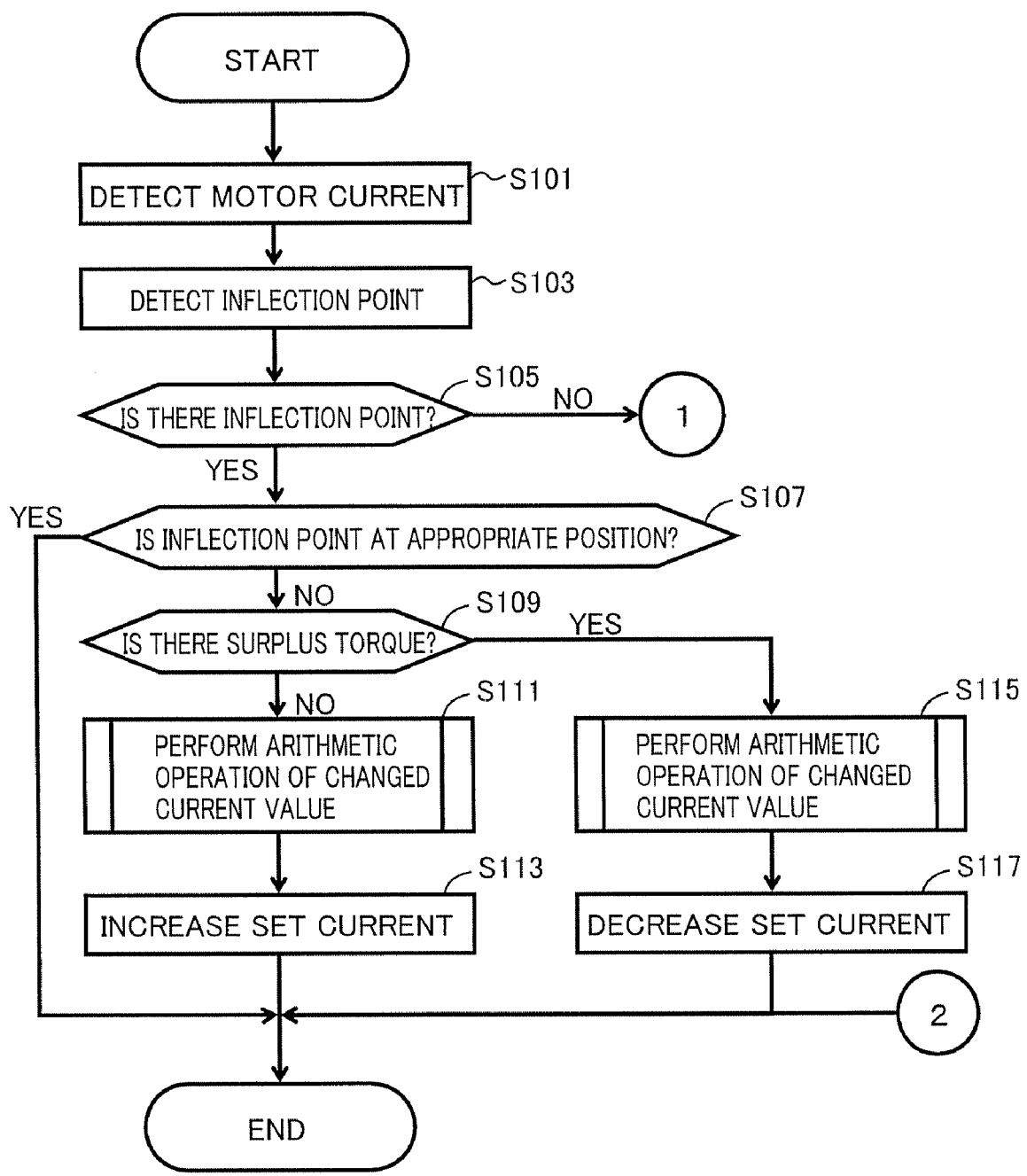
FIGS. 8 and 9 are flowcharts showing a specific example of a process for changing the set value of the constant current that controls driving of the stepping motor in the copier according to the first embodiment.
Figure 9:
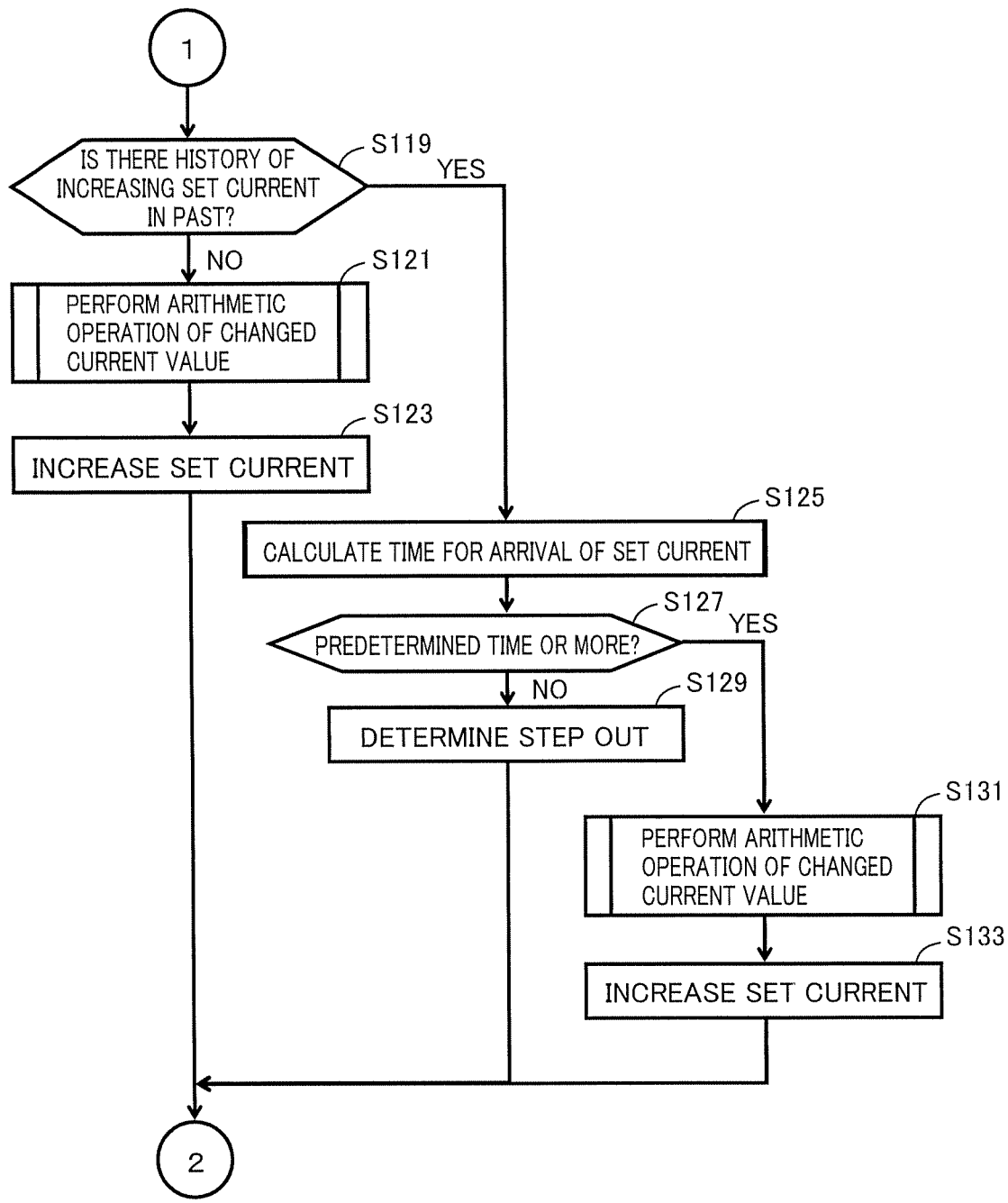

FIGS. 8 and 9 are flowcharts showing a specific example of the process for changing the set value of a constant current that controls driving of the stepping motor in copier 1. CPU 13 reads programs from memory 101 and executes them, whereby the process shown in the flowcharts of FIGS. 8 and 9 is implemented, and the process is performed at a predetermined timing. The predetermined timing is not limited to a specific timing in the present invention. Preferably, examples of the predetermined timing include a timing of pressing down a power switch (not shown) of copier 1 to turn on the power of copier 1 (at the initial operation), a time of image stabilization, and a regular span in accordance with the lapse of time set in advance. Note that if the process is performed at the above timing, it is preferable that CPU 13 deliberately drive stepping motor M prior to the process. Specifically, it is preferable that CPU 13 deliberately operates rollers 42, 43, 35, 37, and the like of paper conveying part 20 under the condition of not feeding a sheet of paper. At this point, an electromagnetic clutch for use in paper conveyance and the like is compulsorily turned on.

With reference to FIG. 8, initially, motor current detecting part 1311 detects a voltage at sense terminal of motor driver circuit 12 and obtains the voltage waveform corresponding to a motor current, which is a current flowing in stepping motor M (step S101). Then, inflection point detecting part 1312 performs a process of detecting an inflection point from the voltage waveform detected in step S101 (step S103).

As a result of the process in step S103, when an inflection point is detected from the voltage waveform corresponding to the motor current (YES in step S105), then it is determined in first determining part 1313 whether the position is an appropriate position (step S107). That is, position NB of inflection point B that is detected in step S103 is compared with aim position NA of the inflection point stored in threshold storage 1314, and it is determined whether they agree. As a result, if it is determined that they agree (YES in step S107), then all the processes that follow are skipped and the process ends. Otherwise (NO in step S107), in step S109, it is further determined in second determining part 1315 whether position NB of inflection point B is positioned closer to the constant-current controlled area than aim position NA or positioned closer to the rising point of the voltage waveform than aim position NA. That is, from the relationships shown in FIGS. 3A to 3C, it is determined whether the motor output with the constant-current value set currently is surplus or not for the load torque required in copier 1 (step S109).

In step S109, if it is determined in second determining part 1315 that position NB of inflection point B is closer to the constant-current controlled area than aim position NA, that is, the motor output with the constant-current value set currently is not surplus for the load torque required in copier 1 (NO in step S109), an arithmetic operation for calculating the set value of the constant current to which the current value is to be changed is performed in operating part 1318 (step S111). Then, control signals for increasing the set current by setting the constant-current value set currently to the set value calculated in step S111 are outputted from signal outputting part 1319 to motor driver circuit 12 (step S113).

If, in step S109, it is determined in second determining part 1315 that position NB of inflection point B is closer to the rising point of the voltage waveform than aim position NA, that is, the motor output with the constant-current value set currently is surplus for the load torque required in copier 1 (YES in step S109), an arithmetic operation for calculating the set value of the constant current to which the current value is to be changed is performed in operating part 1318 (step S115). Then, control signals for decreasing the set current by setting the constant-current value set currently to the set value calculated in step S115 are outputted from signal outputting part 1319 to motor driver circuit 12 (step S117).

On the other hand, as a result of the process in the above step S103, if an inflection point is not detected from the voltage waveform corresponding to the motor current (NO in step S105), the following two kinds of states are conceivable. The first kind of state is that the set value of the constant current is changed too much so that an inflection point occurs at a position very close to the rising point of the voltage waveform. That is, the state is that the motor output with the current set value is too large for the load torque required in copier 1. The second kind of state is that an inflection point is not confirmed until the waveform arrives at the constant current area. That is, the load torque required in copier 1 is too high for the motor output with the current set value so that the state is right before the step out. In this case, based on the histories of changing the set value of the constant current in the past, it is determined that the state is right before the step out if a change for increasing the set value was made. That is, with reference to FIG. 9, it is determined, referring to the histories stored in history storage 1317, in third determining part 1316, whether there is a history of increasing the set value of the constant current in the past (step S119). As a result, if there is no history of increasing the set value of the constant current in the past (NO in step S119), an arithmetic operation for calculating the set value of the constant current to which the current value is to be changed is performed in operating part 1318 (step S121). Then, control signals for increasing the set current by setting the constant-current value set currently to the set value calculated in step S121 are outputted from signal outputting part 1319 to motor driver circuit 12 (step S123).

If, in the determination in step S119, there is a history of increasing the set value of the constant current in the past (YES in step S119), a time from the switching of excitation signals to the arrival of the voltage waveform at the set constant-current controlled area is measured (step S125), and it is determined whether the time is equal to or greater than a predetermined time set in advance (step S127).

The upper limit of the constant-current value that can be set is determined in accordance with the characteristics of stepping motor M and motor driver circuit 12. Therefore, even if a change for increasing the set value is made, there are cases where an inflection point does not occur. Even with the motor current with the voltage waveform having no inflection point, stepping motor M may be driven. However, with the state shown in FIG. 3D, the stepping motor is not driven with an appropriate safety factor secured. That is, this can be said as the state right before the step out. By measuring the time taken for the voltage waveform to arrive at the set constant-current controlled area from the switching of excitation signals, such a state can be identified.

If the time for the motor current to arrive at the set constant-current controlled area is within a predetermined time (NO in step S127), the voltage waveform is in the state shown in FIG. 3D. Therefore, it is determined in third determining part 1316 that stepping motor M is in the state right before the step out (step S129), and the process ends. Note that a process for displaying the result of the determination in step S129 on an operation panel (not shown) may be performed in CPU 13

If the time for the motor current to arrive at the set constant-current value is the predetermined time or more in step S127 (YES in step S127), it is determined in third determining part 1316 that the voltage waveform is in the state shown in FIG. 3A. That is, it is determined in third determining part 1316 that the motor output with the constant-current value set currently is in the state where there is no surplus for the load torque required in copier 1 since the inflection point of the voltage waveform is positioned closer to the constant-current controlled area, so that the inflection point is absorbed thereinto and does not appear. Then, an arithmetic operation for calculating the set value of the constant current to which the current value to be changed is performed in operating part 1318 (step S131). Then, control signals for increasing the set current by setting the constant-current value set currently to the set value calculated in step S131 are outputted from signal outputting part 1319 to motor driver circuit 12 (step S133).

Note that similar arithmetic processes are performed in steps S111, S115, S121, and S131. Specifically, as described above, if the processes in steps S101 and S103 are performed a plurality of times, it is determined in deciding part 1331 whether difference H2 between the maximum and the minimum of the voltage value at the inflection point detected with the results obtained by performing sampling a plurality of times is within the decision width stored in decision width storage 1332. As a result, if difference H2 is within the decision width, it is determined that the fluctuations of the load torque required in copier 1 are not so large, and the constant-current value to which the current value is to be changed is calculated using the aforementioned arithmetic equation (1) in calculating part 1333. If difference H2 is larger than the decision width, it is determined that the fluctuations of the load torque required in copier 1 are large, and the constant-current value to which the current value is to be changed is calculated using the aforementioned arithmetic equation (2) in calculating part 1333.

In copier 1 according to the present embodiment, at the timing such as a time of initial operation and a time of image stabilization, it is determined by using the position of the inflection point of the voltage waveform of the motor current with the set value of the constant current set after the switching of excitation signals whether the motor output under the current setting is appropriate for the load torque required in copier 1, that is, the set value of the constant current is appropriate. Depending on the determination, the set value is changed.

Figure 10:
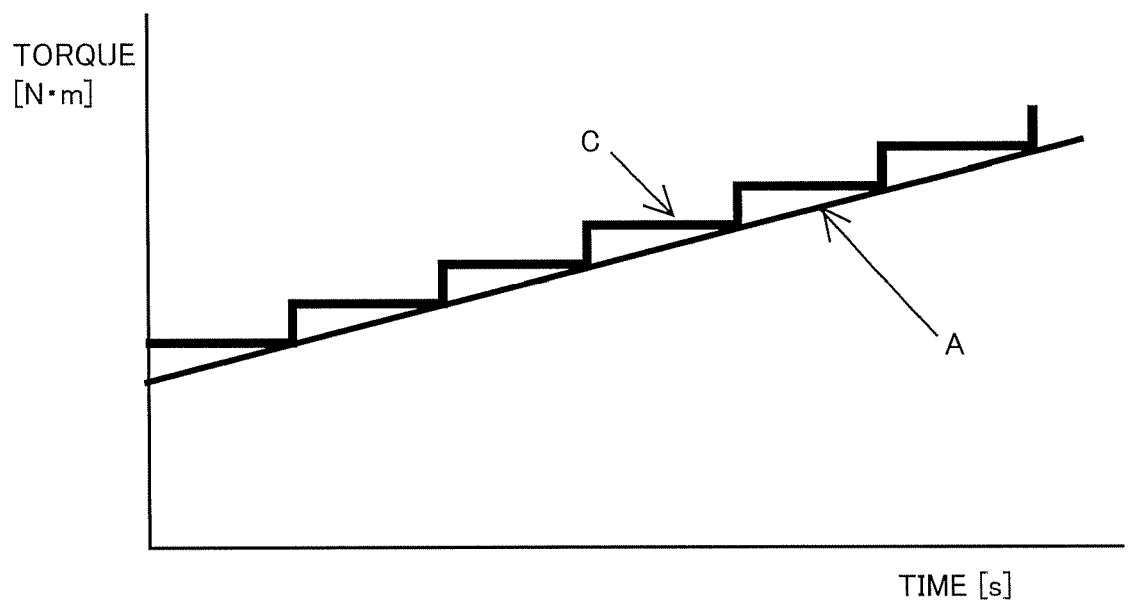
FIG. 10 is a diagram for describing the relationship between changes over time of the load torque required for driving the stepping motor and the constant-current value to be set.

Therefore, in copier 1, as indicated by a line A in FIG. 10, the load torque required for driving the stepping motor in the apparatus rises as the time passes by, whereas, as indicated by a line C in FIG. 10, the constant-current value obtained by incorporating a predetermined safety factor into the load torque required for the above process is set.

Figure 24:
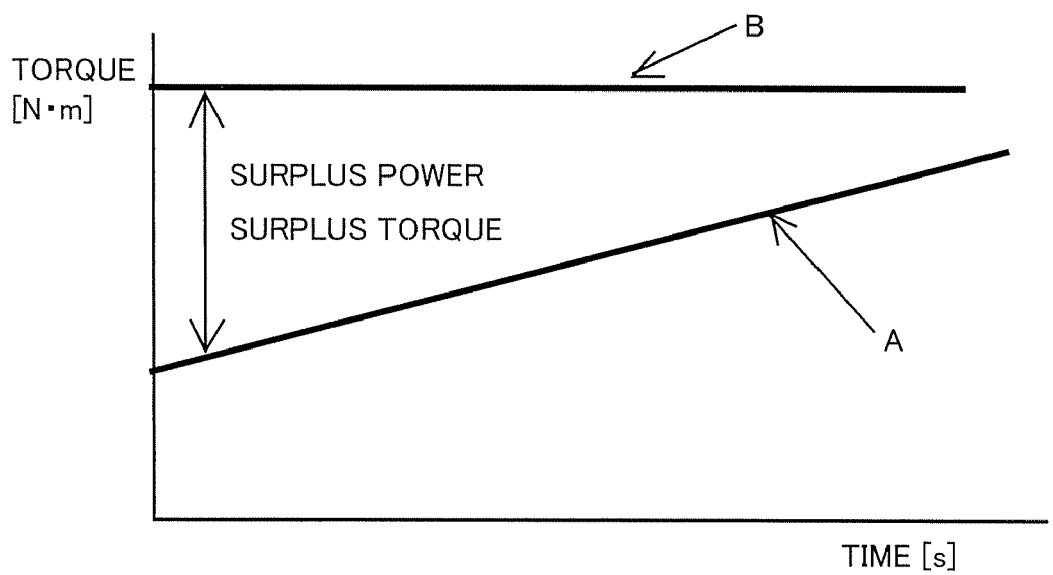
FIG. 24 is a graph showing the relationship between changes over time of the load torque required for driving a stepping motor and a constant-current value to be set.

The control described above is performed in copier 1, allowing the constant-current value to be set in accordance with the load torque required for driving the stepping motor in copier 1. The motor output set currently can be changed to an appropriate output in accordance with the load torque required in copier 1. As a result, consumption of surplus energy beyond the required energy, as previously shown in FIG. 24 can be suppressed. Therefore, vibrations of the stepping motor can be suppressed. As a result, the noise occurring when copier 1 is driven can be suppressed. Energy consumption in copier 1 can also be suppressed, which is effective for energy saving. Furthermore, heat generation of the stepping motor and driving power supply can be suppressed, allowing a cooling mechanism in copier 1 to be eliminated or simplified.

As described above, this control is performed in copier 1, enabling the determination of the possibility of the step out or whether the step out occurs. As the histories of changing of the set value are stored, the change in fluctuations of the load torque required in copier 1 is stored.

In the above control, the set value is calculated so as to be changed to the value obtained by incorporating a predetermined safety factor to the load torque required for driving the stepping motor in copier 1. Therefore, even if the required load torque changes (increases) suddenly, driving of the stepping motor can be controlled if the change is within a predetermined change amount.

Figure 11:
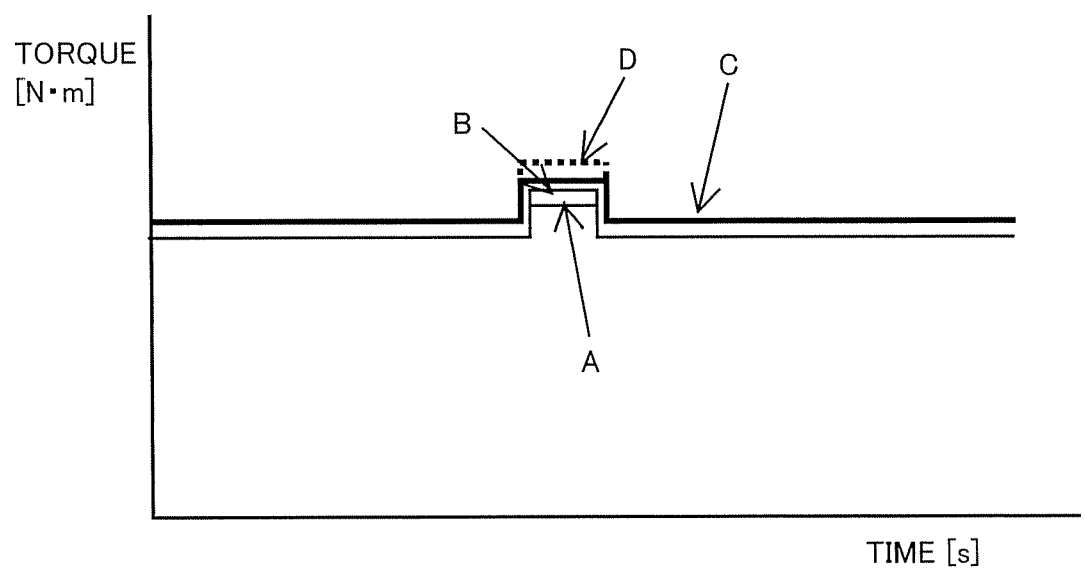
FIG. 11 is a diagram for describing changes over time of the load torque required for driving the stepping motor at the time of feeding a sheet of paper.

Specifically, as shown in FIG. 11, when a sheet of paper is fed, fluctuations (increase) of the load torque caused by the conveyance of printing paper (a line B in FIG. 11) generally occur in addition to fluctuations (increase) (a line A in FIG. 11) of the load torque that occur because of operations of an electromagnetic clutch. Also in such a case, the set value is calculated so as to be changed to the value obtained by incorporating a predetermined safety factor as described above, and therefore the fluctuations of the load torque required for driving the stepping motor in the constant current area can be accommodated (a line C in FIG. 11). As described above, the set value is calculated by sampling the voltage in accordance with the motor current at a predetermined timing to change the set value of the constant current, and therefore driving of the stepping motor can be controlled while keeping abreast of the above fluctuations (a dotted line D in FIG. 11).

Figure 12:
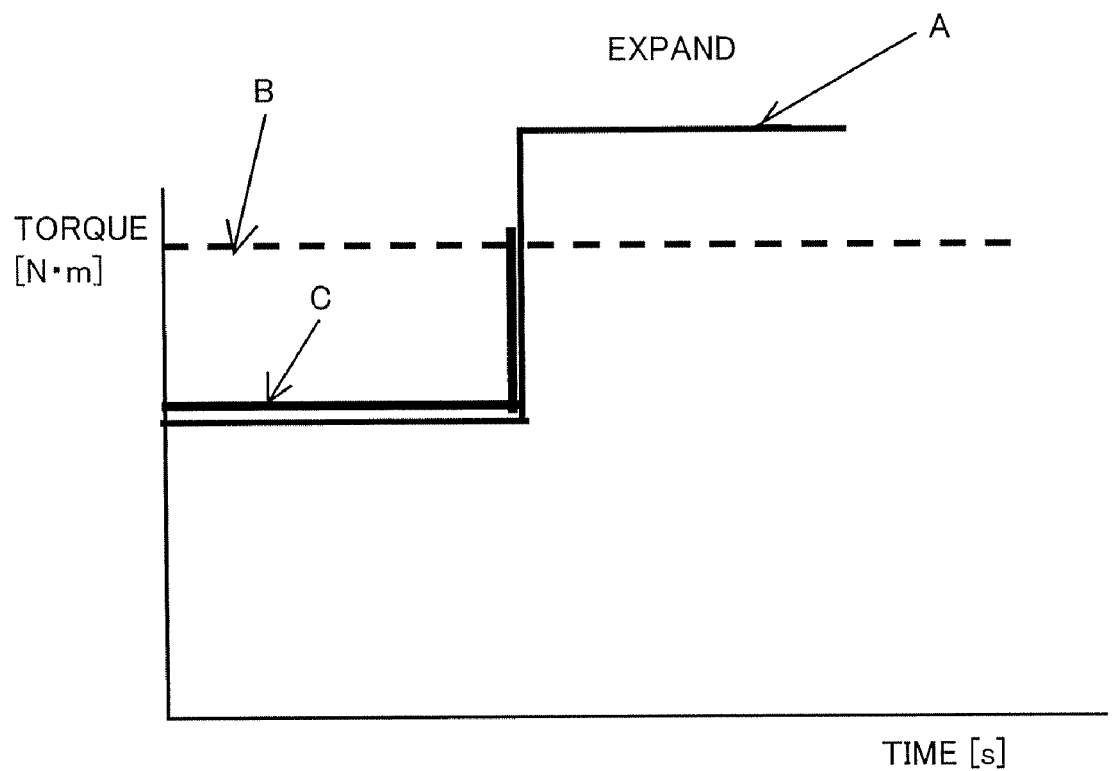
FIG. 12 is a diagram for describing the relationship between changes over time of the load torque required for driving the stepping motor under an abnormal condition and the set value of the constant current.

Further, in the arithmetic processes in steps S111, S121, and S131, CPU 13 preferably compares the upper limit set in advance with the calculated set value of the constant current to be increased, and the set current is increased in the next step if the set value does not exceed the upper limit. As shown in FIG. 12, when an abnormal condition (e.g., jamming) occurs in copier 1, the load torque required for driving the stepping motor may become extremely high (a line A in FIG. 12). In this case, if the set value of the constant current is made too large in accordance with the above control, it leads to breakage and the like of the stepping motor. Therefore, the upper limit (a dotted line B in FIG. 12) is preferably set in advance in CPU 13. Preferably, when it is determined in operating part 1318 that the set value calculated in the above-described arithmetic processes exceeds the upper limit, control signals are outputted from signal outputting part 1319 to motor driver circuit 12 to change the set value to the calculated set value until the set value exceeds the upper limit as indicated by a line C in FIG. 12. Preferably, at the point where the set value exceeds the upper limit, control signals to stop driving the stepping motor are outputted from signal outputting part 1319 to motor driver circuit 12. That is, preferably, CPU 13 performs control to stop driving the stepping motor in accordance with an increase of the required load torque. In this way, even when the set value of the constant current is changed to an optimum value in accordance with the load torque actually required in the image forming apparatus, the set value is never changed to a value equal to or greater than the upper limit. The drive of the stepping motor is stopped when the required load torque is abruptly increased. Therefore, the breakage of the stepping motor can be prevented.

Second Embodiment

Figure 13:
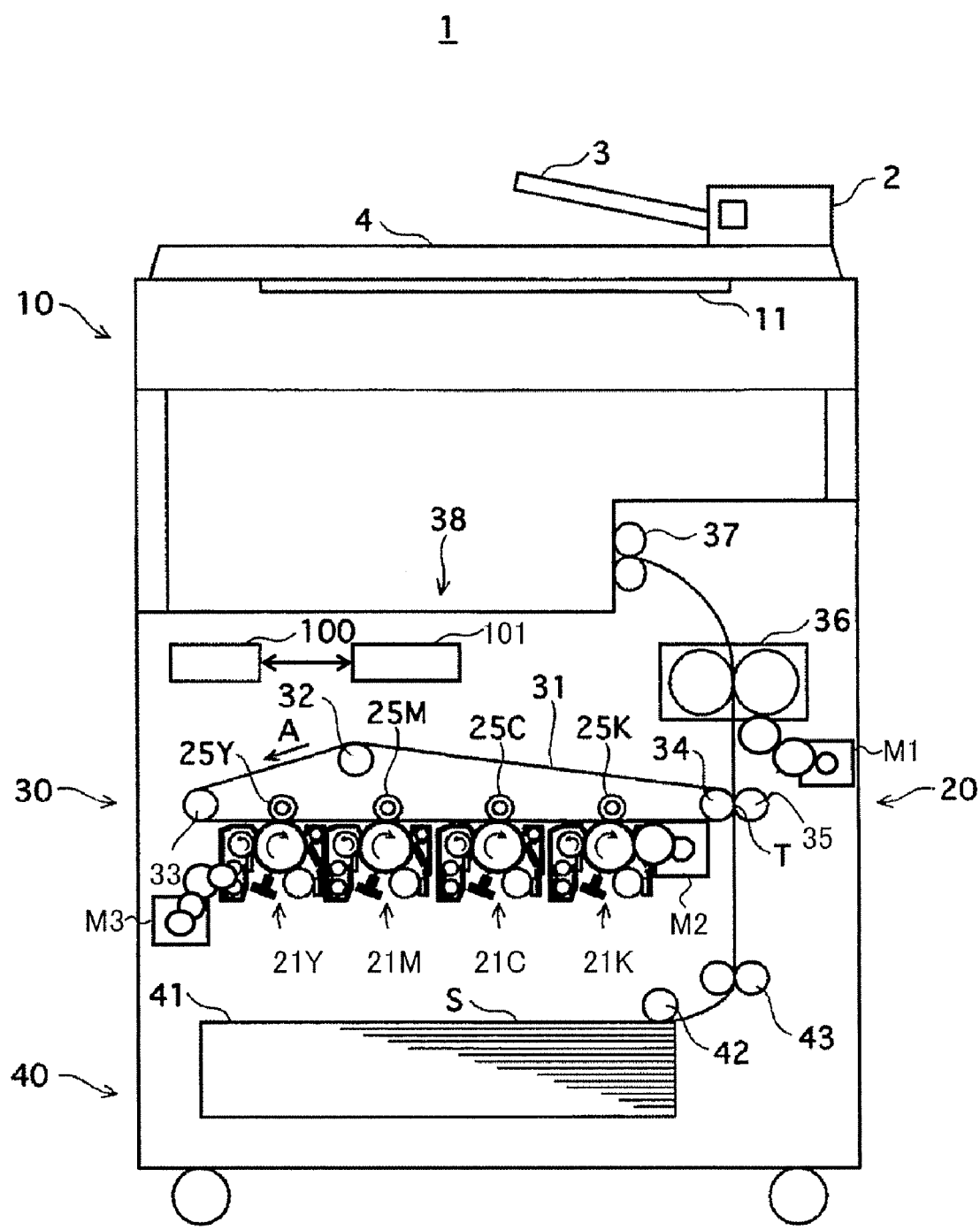
FIG. 13 schematically shows a longitudinal section of a copier that is a second embodiment of the image forming apparatus of the present invention.

FIG. 13 schematically shows a longitudinal section of a copier 1, which is a second embodiment of the image forming apparatus of the present invention Copier 1 according to the present second embodiment has the same hardware configuration as that of copier 1 according to the first embodiment shown in FIG. 1.

Image forming parts 21Y, 21M, 21C, and 21K of copier 1 according to the second embodiment are configured to be attached with cartridges that contain toners, each of which corresponds to each color, although not described in connection with FIG. 1.

Specifically, in the second embodiment, with reference to FIG. 13, a stepping motor M1 refers to one specific example of a stepping motor for use in a fixing driver, a stepping motor M2 to one specific example of a stepping motor for use in a PC (Photo Conductor) driver, and a stepping motor M3 to one specific example of a stepping motor for use in a toner supply driver. The representative of stepping motors M1 to M3 is referred to as a "stepping motor M". Note that, in the present invention, the drive mechanism for which a stepping motor is used is not limited to the above mechanisms, and the stepping motor may be used in other mechanisms. The stepping motor may also be used in any one or two of the above mechanisms.

Figure 14:
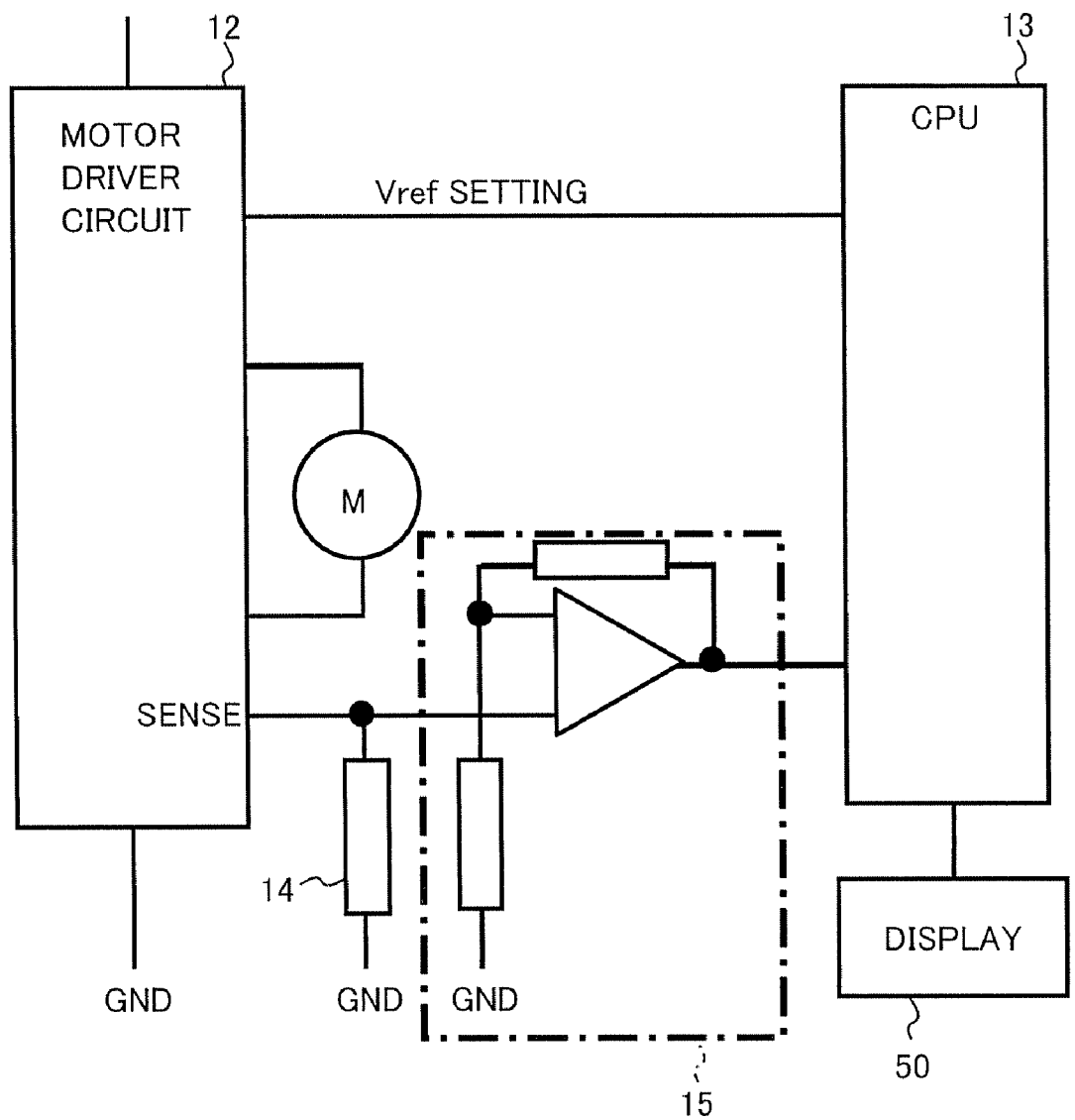
FIG. 14 shows a specific example of an equivalent circuit diagram of a drive circuit for controlling driving of a stepping motor of the copier according to the second embodiment.

FIG. 14 shows a specific example of the equivalent circuit diagram of a drive circuit according to the second embodiment for controlling driving of a stepping motor. In the second embodiment, in addition to the circuit configuration described in the first embodiment referring to FIG. 2, CPU 13 is connected to a display 50 (not shown in FIG. 13) provided in copier 1. CPU 13 displays on display 50 information based on a value of a current flowing in stepping motor M as described later.

In copier 1 according to the second embodiment, the drive state (drive environment) of a stepping motor is determined based on the position of an inflection point of a motor current when driving of the motor is started, that is, a time from the start of driving of the motor to the occurrence of an inflection point or the motor current value at the occurrence of an inflection point. In accordance with the determination, messages are displayed and the value of the target current for the motor current is decided in copier 1.

Figure 15:
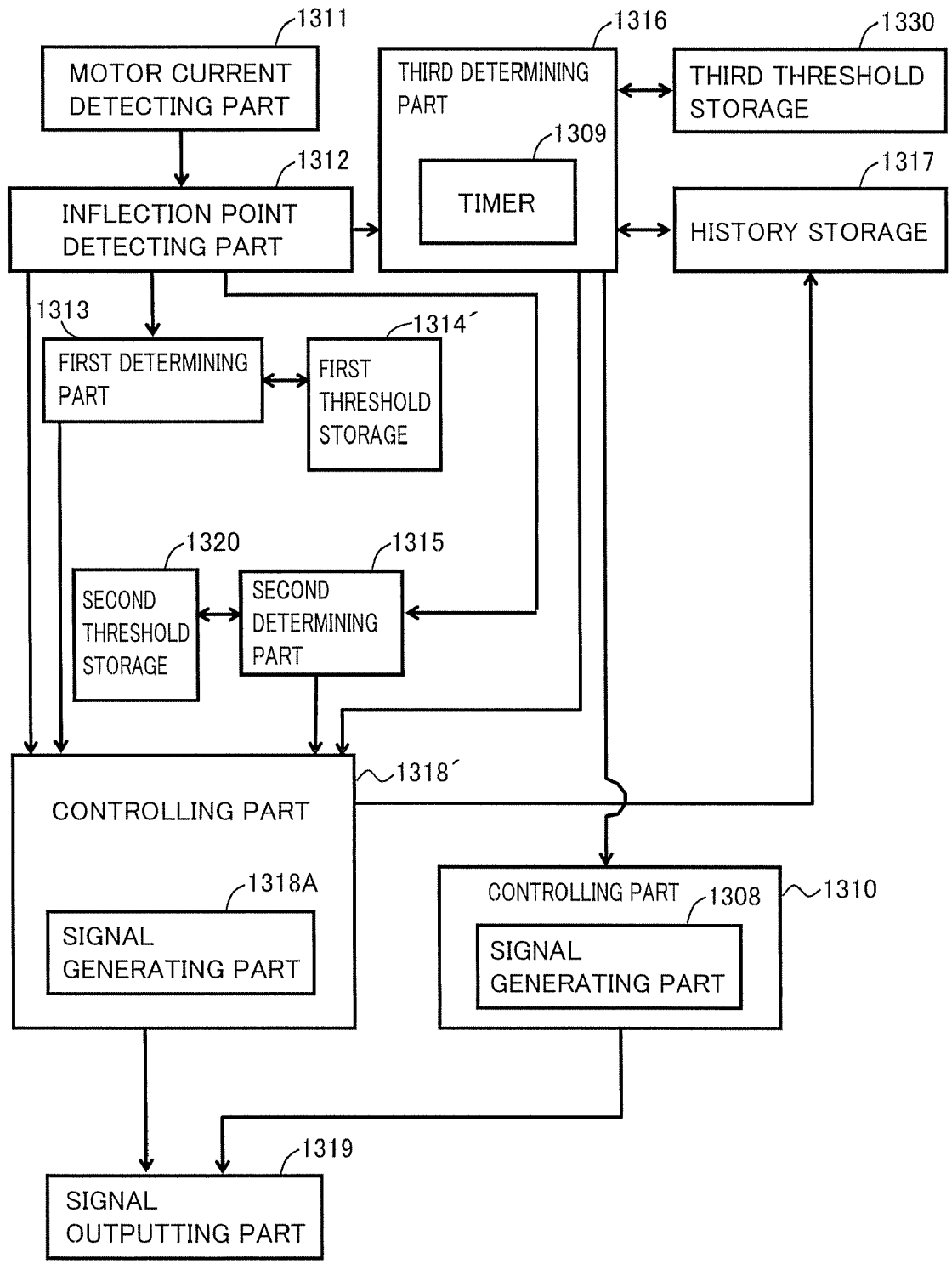
FIG. 15 is a block diagram showing a specific example of the functional configuration for changing the set value of a constant current in the copier according to the second embodiment.

FIG. 15 is a block diagram showing a specific example of the functional configuration for deciding the state of each stepping motor in copier 1 according to the second embodiment. CPU 13 reads programs from memory 101 and executes them, whereby the functions shown in FIG. 15 are formed mainly in CPU 13. However, at least part of them may be formed by the hardware configuration shown in FIG. 13. The functions shown in FIG. 15 are mounted in copier 1 so as to allow the state of each stepping motor to be decided independently of each other.

With reference to FIG. 15, functions for deciding the state of the stepping motor are configured including a controlling part 1310, a second threshold storage 1320, and a third threshold storage 1330 in addition to the functional configuration for changing the set value of the constant current in copier 1 according to the first embodiment, which is shown in FIG. 4. Also, the functions are configured including a first threshold storage 1314' in place of threshold storage 1314 and a controlling part 1318' in place of operating part 1318.

First threshold storage 1314' and second threshold storage 1320 are constructed mainly in memory 101 and the like as threshold storage 1314, and stores a threshold used for determining whether the position of the inflection point is appropriate. For example, an upper limit CU and a lower limit CD for the load converted from the current value (or voltage value) at the inflection point for each motor are stored in first threshold storage 1314' and second threshold storage 1320, respectively Note that a known method may be adopted as the method of converting the current value (or voltage value) in a stepping motor at an inflection point into the load of the stepping motor.

When an inflection point is detected from the voltage waveform corresponding to the current waveform of the motor current in inflection point detecting part 1312, first determining part 1313 converts the voltage value corresponding to the inflection point into the load of the stepping motor and determines whether the load is less than threshold (CU) stored in first threshold storage 1314'. The result is inputted into controlling part 1318'. Second determining part 1315 converts the voltage value corresponding to the inflection point into the load of the stepping motor and determines whether the load is greater than threshold (CD) stored in second threshold storage 1320. The result is inputted into controlling part 1318'. Thresholds CU and CD may be stored in advance in first threshold storage 1314' and second threshold storage 1320, respectively. Setting operations may be accepted at an operation panel (not shown) and the result may be stored in first threshold storage 1314' and second threshold storage 1320 based on operation signals from the operation panel.

Note that controlling part 1318' can set the current value of the target current when the load of the stepping motor obtained from the inflection point in the above mariner is out of the range defined by the above thresholds CU and CD (not less than threshold CU or not more than threshold CD).

Third threshold storage 1330 is constructed mainly in memory 101 and stores a threshold used for determining whether the step out occurs. If an inflection point is not detected from the motor current in inflection point detecting part 1312, then third determining part 1316 determines whether there is a history of increasing the set value in the past by referring to the above histories stored in history storage 1317. If there is no history, third determining part 1316 inputs the result of the determination into controlling part 1318'. Third determining part 1316 includes a timer 1309. If there is a history of increasing the set value in the past, third determining part 1316 measures, with timer 1309, the time elapsed from the rising point to the constant-current controlled area by the voltage waveform corresponding to the current waveform of the motor current obtained in inflection point detecting part 1312. Then, it is determined whether the time exceeds the threshold stored in third threshold storage 1330. If the time exceeds the threshold, the result of the determination is inputted into controlling part 1318'. If the time does not exceed, it is determined that the step out occurs, and the result of the determination is inputted into controlling part 1310.

Controlling part 1318' includes a signal generator 1318A and causes signal generator 1318A to generate signals specifying a message to be displayed on display 50 based on the result of the determination inputted from first determining part 1313, second determining part 1315, and third determining part 1316. The signals are inputted into signal outputting part 1319.

Controlling part 1310 includes a signal generator 1308. Based on the result of determination that the step out occurs, which result is inputted from third determining part 1316, signal generator 1308 generates control signals for causing signal outputting part 1319 to output control signals to necessary parts in accordance with areas where the stepping motor of interest is used. The control signals are inputted into signal outputting part 1319

Figure 16:
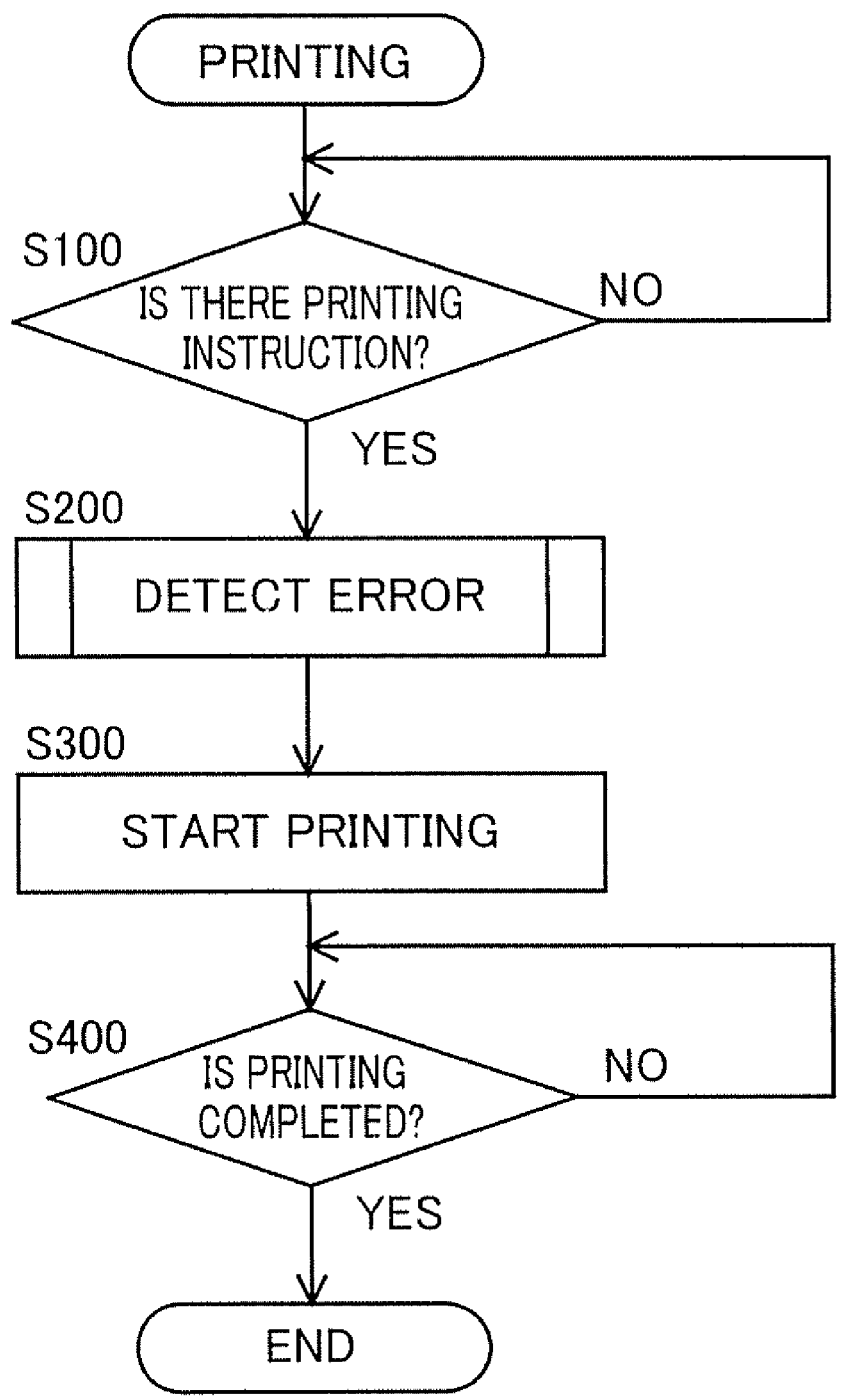
FIG. 16 is a flowchart of a printing process executed in the copier according to the second embodiment.

FIG. 16 is a flowchart showing a specific example of the content of the process in which copier 1 according to the second embodiment forms an image on a sheet of paper in accordance with reading of an image by a scanner or an instruction from an external device connected to copier 1 such as a personal computer, that is, a printing process.

With reference to FIG. 16, initially, controller 100 determines in step S100 whether an instruction to form an image on a sheet of paper (printing instruction) is issued. Note that there may be a case where the instruction is issued by controller 100 itself at the time when the reading of an image by the scanner is completed during execution of a copying process, which is a process where an image that is read by the scanner is formed on a sheet of paper, in copier 1, and there may also be a case where the instruction is transmitted together with image data from the external device.

Next, controller 100 executes an error detection process in step S200. The content of the process will be described with reference to FIG. 17 showing a flowchart of a subroutine of the process Note that the following description will be given on a type in which each of image forming parts 21Y, 21M, 21C, and 21K in FIG. 13 accompanied by a toner cartridge for each color constitutes a unit, and each image forming part 21, together with each toner cartridge, is replaced when the toner becomes empty.

Figure 17:
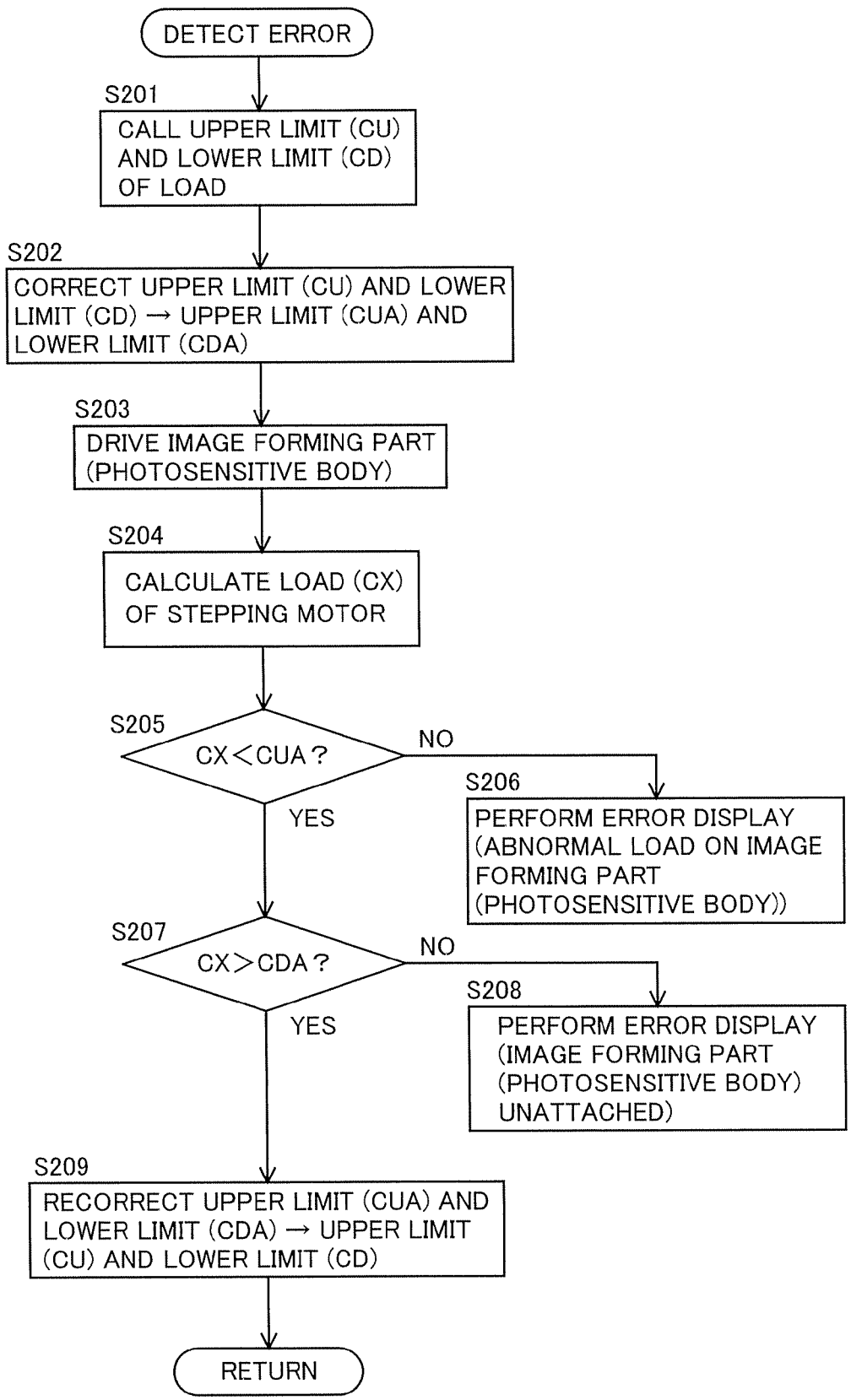
FIG. 17 is a flowchart of a subroutine of an error detection process of FIG. 16.

With reference to FIG. 17, in the error detection process, controller 100 initially, in step S201, reads the upper limit (threshold CU) of the load for the stepping motor (M2) that drives a photosensitive body (Photo Conductor) from first threshold storage 1314'. Controller 100 also reads the lower limit (threshold CD) of the load for the stepping motor from second threshold storage 1320. These values are written into a random access memory (RAM) and the like in controller 100, and the process proceeds to step S202.

In step S202, controller 100 corrects and updates the upper limit and the lower limit read in step S201, based on environmental temperature (temperature in the periphery of the photosensitive body) of image forming part 21 and the like. Note that the upper limit after the correction is referred to as an "upper limit CUA" and the lower limit after the correction is referred to as a "lower limit CDA".

Next, in step S203, controller 100 drives the photosensitive body by energizing the above stepping motor.

Then, in step S204, controller 100 calculates a load (CX) of the stepping motor from an "inflection point" occurring when the stepping motor is energized in step S203, as described referring to FIGS. 3A to 3D and the like.

Next, in step S205, controller 100 determines whether the load calculated in step S204 is smaller than upper limit CUA obtained in step S202. Then, if controller 100 determines that this is the case, the process proceeds to step S207, whereas if controller 100 determines that this is not the case, the process proceeds to step S206.

In step S206, controller 100 determines that an abnormal load is applied on the photosensitive body, causes display 50 to display an error message as such, and stops the operations to terminate the process.

On the other hand, in step S207, controller 100 determines whether the load calculated in S204 is larger than lower limit CDA obtained in step S202. Then, if controller 100 determines that this is the case, the process proceeds to step S209, whereas if controller 100 determines that this is not the case, the process proceeds to step S208.

In step S208, controller 100 determines that a unit of image forming part 21 is not attached, causes display 50 to display an error message as such, and stops the operations to terminate the process.

On the other hand, in step S209, controller 100 returns the upper limit and the lower limit corrected in step S204 to their original states and then updates them, which causes the process to return to the flowchart shown in FIG. 16.

Referring again to FIG. 16, after step S200, controller 100 starts the process of printing an image on a sheet of paper in step S300 by suitably controlling paper conveying part 20 and image formation part 30. Then, in step S400, upon detection of the completion of printing, controller 100 finishes the process.

In the printing process described with reference to FIGS. 16 and 17, when an instruction of printing is provided, image forming part 21 including the photosensitive body is driven and the load of the stepping motor used for the driving is calculated. Then, it is determined whether the value of the load is within a range determined in advance, which is a range defined by the upper limit and the lower limit. Then, if it is determined that the value of the load is within the range, printing is performed, whereas if it is determined that the value is not within the range, an error message is displayed on display 50 and the process is terminated. Note that when an error message is displayed, copier 1 is restored to a state where controller 100 executes the process again from step S100 when a countermeasure to resolve the error (attachment of a unit of the image forming part including the photosensitive body and the like) is taken by the user.

In the printing process described above, a reference has been made to the error processing performed over the entire image forming part including the photosensitive body. Actually, however, the error detection process is executed for each of image forming parts 21Y, 21M, 21C, and 21K. That is, in the actual processing, the error processing (call of the upper limit and the lower limit and correction thereof, driving by the stepping motor, calculation of the load, comparison with the upper limit and the lower limit, and the error display as needed) is first performed for image forming part 21Y. Then, if no error display is made, the error processing is performed for image forming part 21M. Then, if no error display is made for image forming part 21M, the error processing is performed for image forming part 21C. If no error display is made for image forming part 21C, the error processing is performed for image forming part 21K. Then, if no error display is made in the error processing for image forming part 21K, printing is started.

Note that copier 1 may be configured such that even if an error display is made in the error processing for any of image forming parts 21Y, 21M, 21C, and 21K, the error processing is performed for all image forming parts 21Y, 21M, 21C, and 21K. In this case, only when no error display is made in the error processing for all of image forming parts 21Y, 21M, 21C, and 21K, printing operations are performed. Note that the printing operations are, in other words, operations for transferring a developing agent (exemplified by the toner in the present embodiment) onto a sheet of paper.

In the second embodiment described above, when an instruction for printing is provided, an image forming part including a photosensitive body is driven by a stepping motor before actual printing operations are performed, and the value of the load of the stepping motor is calculated. If the value of the load is not within a predetermined range, an error display is made. That is, in the second embodiment, the state of the image forming part including the photosensitive body (a state where the load for driving becomes abnormally large because of intrusion of a foreign substance in the periphery, a state where no cartridge is attached, or the like) can be detected without providing a special sensor by detecting the load of the stepping motor. Therefore, the number of members constituting copier 1 can be reduced, which contributes to reduction in cost and size.

Note that the state that can be detected by detecting the value of the load of the stepping motor is not limited to the state of image forming part 21 including the photosensitive body. For example, it is conceivable that, by detecting the value of the load of the stepping motor that drives a heating roller included in fixer 36, the state of the heating roller could also be detected. It is also conceivable that, by detecting the value of the load of the stepping motor that drives a mechanism for driving rollers 42, 43, 35, and 37 of paper conveying part 20, the state (occurrence of a jam and the like) of the rollers could also be detected. Note that a type in which each image forming part 21 is replaced together with each toner cartridge has been described in the above description. However, in a type of replacing only the toner cartridge, removal of image forming parts 21Y, 21M, 21C, and 21K for replacement for the purpose of maintenance can also be detected with the same configuration.

Third Embodiment

Figure 18:
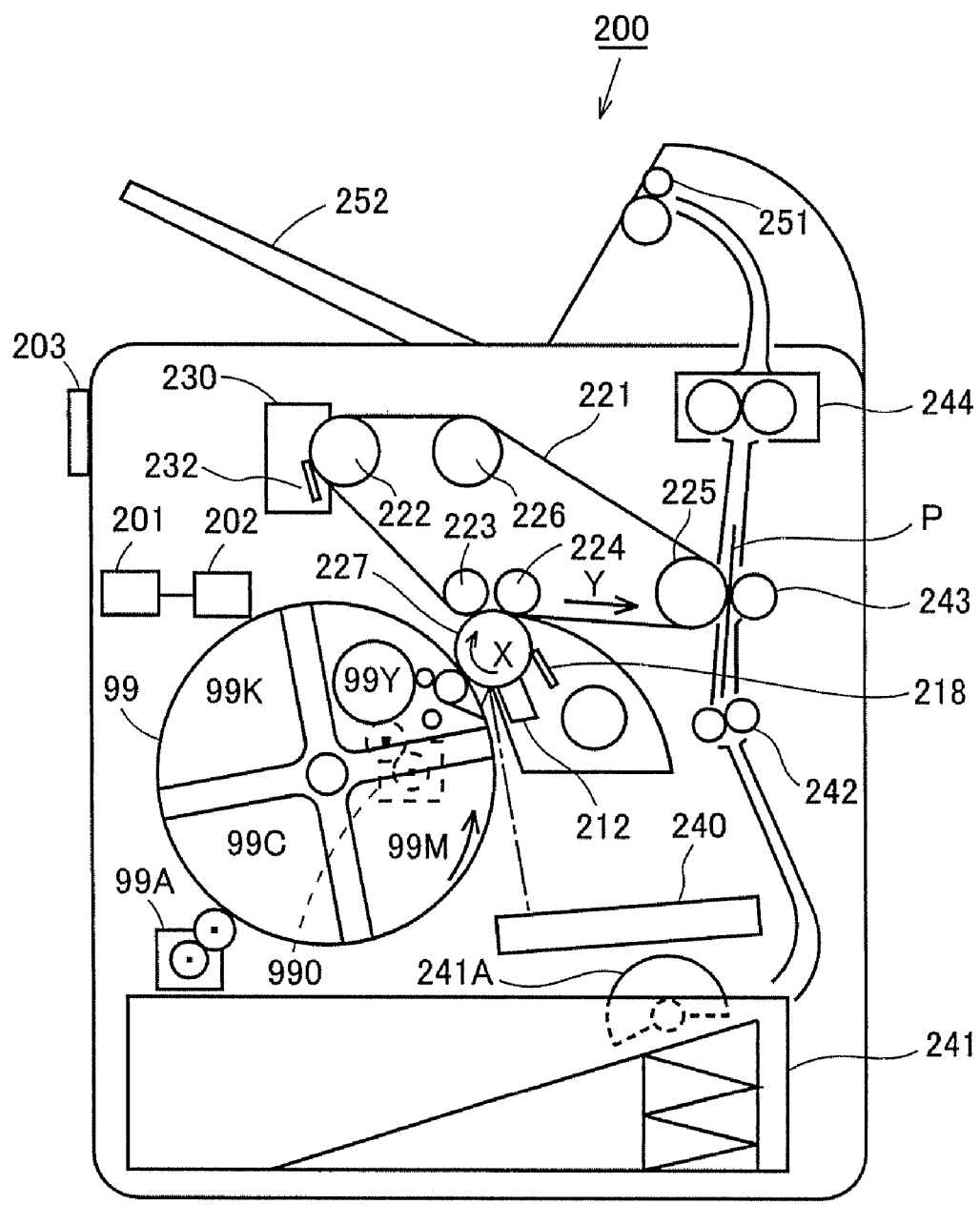
FIG. 18 schematically shows a longitudinal section of a color printer that is a third embodiment of the image forming apparatus of the present invention.

FIG. 18 schematically shows a longitudinal section of a color printer 200, which is a third embodiment of the image forming apparatus of the present invention.

Color printer 200 includes a controller 201 that performs overall control over the operations of color printer 200, a memory 202 that stores programs that controller 201 executes and various data, and a display 203. The display content of display 203 is controlled by controller 201.

Color printer 200 is mainly constituted of a photosensitive unit including a photoconductor drum 227 and a charger 212, a developing unit including a developing rack 99, an intermediate transfer unit including an intermediate transfer belt 221, a laser scanning unit including an exposure machine 240, and a fixing unit including a fixing device 244.

In the photosensitive unit, photoconductor drum 227 is charged by charger 212 and is rotated in the direction of an arrow X in FIG. 18 by a driving device (not shown).

Developing rack 99 has developers 99K, 99C, 99M, and 99Y of colors of black, cyan, magenta, and yellow, respectively. They are disposed integrally and rotatably around a spindle in developing rack 99. Note that developers 99K, 99C, 99M, and 99Y, together with toner cartridges containing toners of respective colors, are configured to be removable from developing rack 99.

Intermediate transfer belt 221 is suspended by a cleaner facing roller 222, a primary transfer wind roller 223, a primary transfer roller 224, a secondary transfer facing roller 225, and a tension roller 226, that is, five rollers. Primary transfer wind roller 223 is rotationally driven, causing intermediate transfer belt 221 to be rotationally driven in the direction of an arrow Y.

In color printer 200, photoconductor drum 227 is exposed to light by exposure machine 240, thereby forming an electrostatic latent image on photoconductor drum 227. The electrostatic latent image is developed (formed into a toner image) by developers 99K, 99C, 99M, and 99Y of developing rack 99. Then, the toner image is transferred to intermediate transfer belt 221. In color printer 200, a secondary transfer roller 243 is disposed at a position facing secondary transfer facing roller 225. A sheet of paper P, which is a transfer material, is conveyed to a nip part constituted by intermediate transfer belt 221 supported by secondary transfer facing roller 225 and secondary transfer roller 243, and the toner image on intermediate transfer belt 221 is transferred onto sheet of paper P in the nip part. Sheet of paper P on which the toner image has been transferred is conveyed to fixing device 244. Accordingly, the toner image is fixed onto sheet of paper P. Thereafter, sheet of paper P is ejected to the outside of color printer 200 by a paper discharge roller 251 and is conveyed onto a paper ejection tray 252.

In the third embodiment, transfer from photoconductor drum 227 to intermediate transfer belt 221 is referred to as "primary transfer", and transfer from intermediate transfer belt 221 to sheet of paper P is referred to as "secondary transfer".

Note that, in color printer 200, cleaner blades 232 and 218 for removing unnecessary substances such as remaining toner on surfaces of intermediate transfer belt 221 and photoconductor drum 227 are provided.

Figure 19:
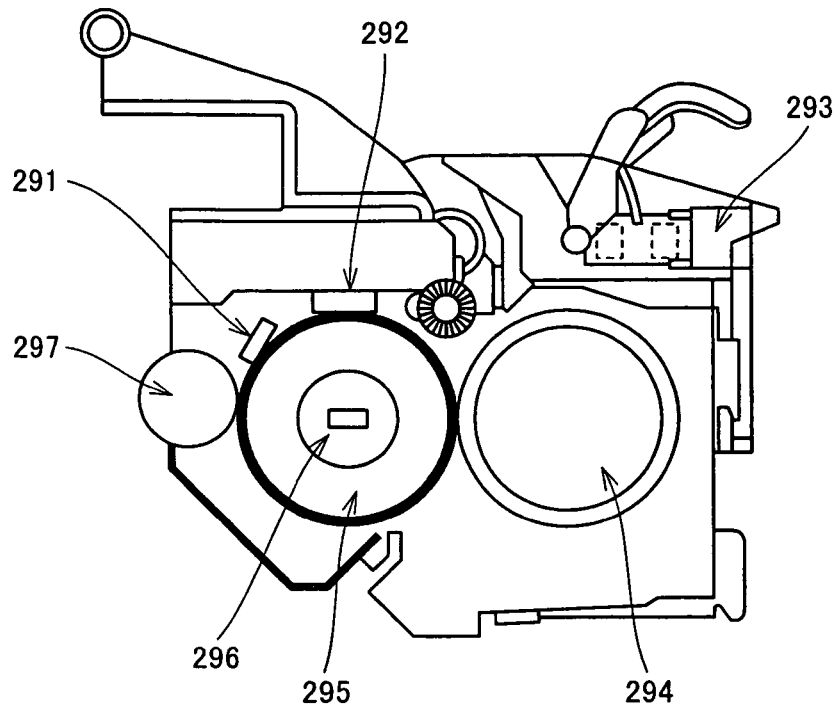
FIG. 19 is an enlarged view of a fixing device of the color printer according to the third embodiment.

FIG. 19 is an enlarged view of fixing device 244 of color printer 200

With reference to FIG. 19, fixing device 244 includes a thermistor 291, a thermostat 292, a sheet ejection sensor 293, a pressure roller 294, a heating roller 295, heater lamp 296, and a cleaning roller 297.

Pressure roller 294 applies pressure to toner on a sheet of paper conveyed into fixing device 244 and fixes the toner onto the sheet of paper.

Heating roller 295 applies heat and pressure to toner on the sheet of paper, so that heating roller 295, together with pressure roller 294, fixes the toner on the sheet of paper. Heating roller 295 generates heat by power supplied through controller 201 and is rotationally driven by a motor that is not shown (a fixing motor 298 to be described later).

Thermistor 291 detects the temperature of heating roller 295. The detected output of thermistor 291 is inputted into controller 201.

When the temperature of heating roller 295 exceeds a predetermined temperature, thermostat 292 turns off the power supply to heating roller 295, thereby adjusting the temperature of heating roller 295.

Sheet ejection sensor 293 detects a sheet of paper conveyed from pressure roller 294 and heating roller 295. The detected output of sheet ejection sensor 293 is inputted into controller 201.

Controller 201 turns on heater lamp 296 during a heat application period of heating roller 295. Cleaning roller 297 is provided to remove paper dust adhering to heating roller 295.

Figure 20:
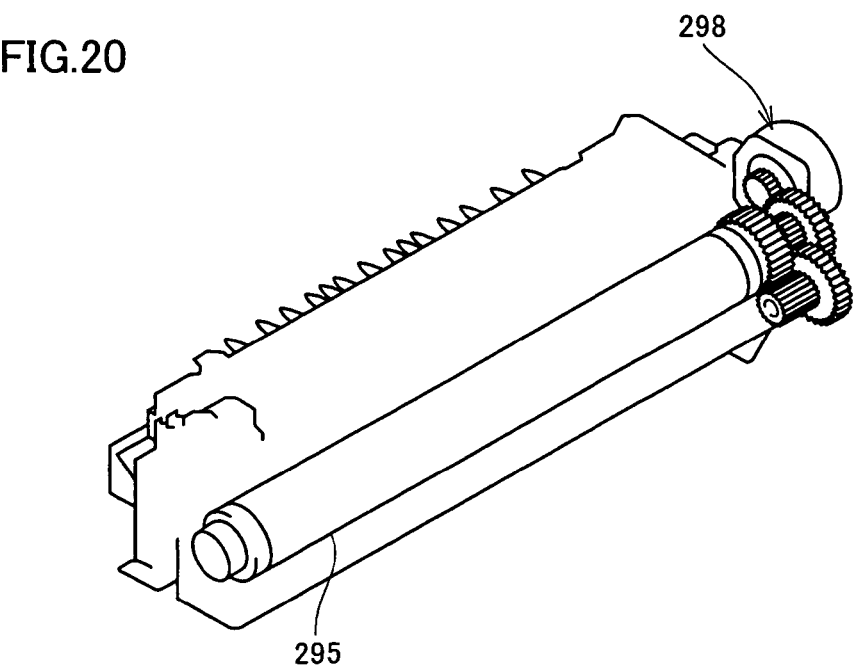
FIG. 20 is an enlarged view of the vicinity of a heating roller of FIG. 19.

FIG. 20 is an enlarged view of the vicinity of heating roller 295 of FIG. 19.

With reference to FIG. 20, in color printer 200, fixing motor 298 is provided for rotationally drive heating roller 295 in the vicinity of heating roller 295. Fixing motor 298 is constituted by a stepping motor. As described as the operations of controller 100 (CPU 13) in the second embodiment, controller 201 can calculate the load on fixing motor 298 by detecting changes in the current value (or voltage value) when power is supplied to fixing motor 298.

In memory 202 of color printer 200, information on the range of values that are ideal for the load of fixing motor 298 is stored. Controller 201 compares the load of fixing motor 298 with the range of ideal values. If the load of fixing motor 298 is outside the range, controller 201 determines that an abnormal condition occurs in the operation state of fixing motor 298 and causes display 203 to display an error message.

The display of an error message by controller 201 will be described below.

Figure 21:
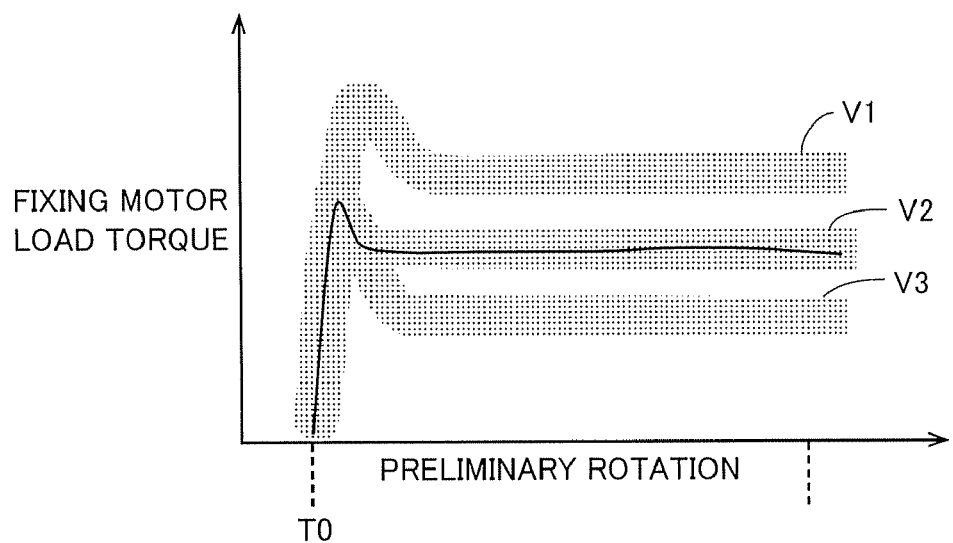
FIG. 21 shows values concerning the load of a fixing motor, which values are stored in a memory of the color printer according to the third embodiment.

FIG. 21 shows one example of the range of ideal values for the load of fixing motor 298 and the actual load of fixing motor 298 from the start of supplying power to fixing motor 298.

With reference to FIG. 21, three kinds of regions, i.e., regions V1 to V3, indicated with hatching, are regions each showing the range of load values of fixing motor 298 that are ideal in a case where power is supplied to fixing motor 298 from a time T0. Information for specifying regions V1 to V3 is stored, e.g., in memory 202. Note that region V1 is a region in a mode where a sheet of paper printed in color printer 200 is plain paper, namely, a sheet of paper having an average thickness that is generally used. Region V2 is a region in a mode where a sheet of paper, such as an envelop, to be printed is thicker than the plain paper. Region V3 is a region in the case where operations are performed in a jamming processing mode. The jamming processing mode refers to a state where the space between heating roller 295 and pressure roller 294 is expanded and the contact pressure is decreased to facilitate removal of a sheet of removal of a sheet of paper pinched therebetween. Region V1, region V2, and region V3 all mean that there is a variety in the load values that are ideal for a specific time. Information for specifying regions V1 to V3 may be stored in memory 202 in advance, or setting operations may be accepted in an operation panel that is not shown and the result may be stored in memory 202 based on operation signals from the operation panel.

Region V1, region V2, and region V3 are positioned in order of load value with the highest one top. This means the nip pressure between pressure roller 294 and heating roller 295 decreases in this order.

A solid line in FIG. 21 is one example of the actual measured value of changes over time of the load of fixing motor 298.

Controller 201 preliminarily supplies power to fixing motor 298 for a predetermined time during a period of not performing printing operations as described in the second embodiment and during a period of not even receiving a printing instruction, thereby obtaining the load indicated by the solid line in FIG. 21. Then, controller 201 determines whether the load indicated by the solid line is included in the aforementioned range. If controller 201 determines that the indicated load is included in the range, controller 201 directly finishes preliminary supply of power and prepares for printing operations. On the other hand, if the load indicated by the solid line is not included in the aforementioned range, controller 201 stops the preliminary power supply and causes an error message to be displayed.

If there are a plurality of regions that are ideal as shown in FIG. 21, controller 201 confirms the content of setting stored in memory 202 prior to preliminarily supplying power so as to decide which region is the target of determination. Specifically, controller 201 evaluates the information stored in memory 202 for the current operation mode of color printer 200 prior to the preliminary supply of power and determines whether information corresponding to "plain paper" or information corresponding to an "envelope" is stored as the information on setting for the sheet of paper to be printed. If controller 201 determines that the former is the case, controller 201 decides region V1 as the target of determination, whereas if controller 201 determines that the latter is the case, controller 201 decides that region V2 is the target of determination.

In the case as shown in FIG. 21, the solid line is included in region V2. Accordingly, if region V2 is decided as the target of determination, controller 201 is on standby for printing operations without causing display 203 to display an error message. On the other hand, if region V1 has been decided as the target of determination, namely, if it is found that a load torque corresponding to an envelop actually occurs in spite of setting of the state of using plain paper, controller 201 causes display 203 to display an error message. If the load torque is within region V3, printing operations are performed in a jamming processing mode. Therefore, controller 201 stops the operations and causes display 203 to display an error message.

In the third embodiment described above, in color printer 200, controller 201 can detect information on the environment of heating roller 295 of fixing device 244 based on the load of fixing motor 298 without providing a special sensor.

It is preferable that driving of heating roller 295 for such detection is performed during a warm-up period before the printing operations are performed.

Note that, in the third embodiment, whether an error message is displayed, that is, whether the state of heating roller 295 is in a basic state, is determined depending on whether the load on fixing motor 298 that drives heating roller 295 is within the ranges such as regions V1 to V3 and the like. However, ideal curve lines, instead of ideal regions, are stored in memory 202, and the determination may depend on whether the load at that point is within a certain margin of error for the value of the corresponding time on the curved line.

In the third embodiment, the regions that are ideal are set across the entire preliminary driving time. However, the regions are not limited thereto and may be set only for part of the preliminary driving time. In this case, controller 100 determines only for the part of the time whether the load of the motor is within the range of the regions and decides whether to cause an error message to be displayed.

Note that, in the third embodiment, the target of the error message is not limited to the state of heating roller 295 of fixing device 244. In addition, developing rack 99 may be the target. The display of the error message in such a case will be given below.

Figure 22:
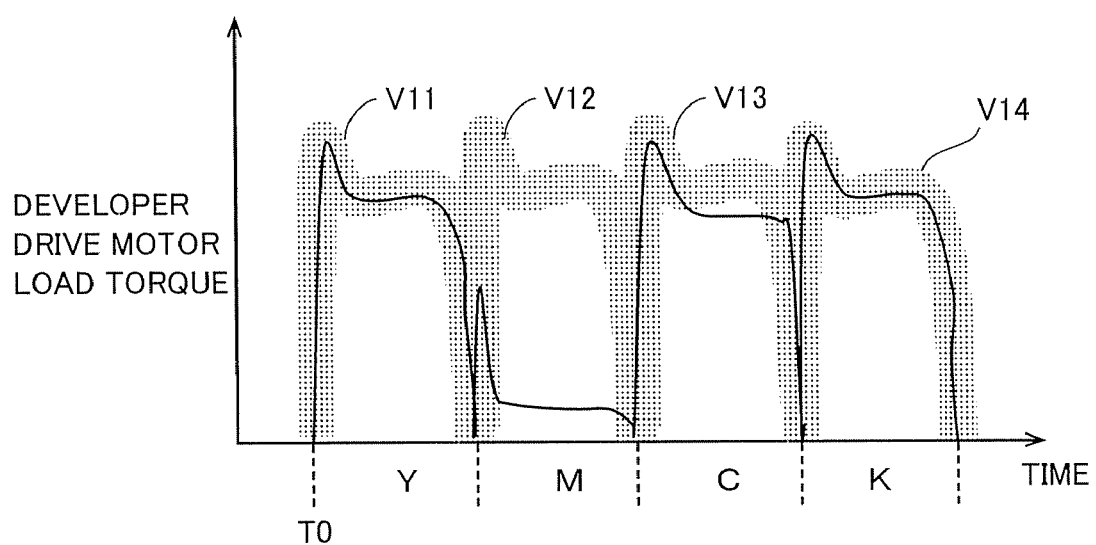
FIG. 22 shows values concerning the load of a developer motor, which values are stored in the memory of the color printer according to the third embodiment.

Shown in FIG. 22 are, for a period in which developing rack 99 is rotationally driven for one rotation, ideal regions for changes in the load from the driving start time (time T0) of a developer drive motor 990 that rotationally drives the developer, which are shown as regions V11 to V14, and actual changes in the load indicated by the solid line.

In FIG. 22, a period of rotating developer (developing roller) 99Y while supplying yellow toner from developer 99Y to photosensitive body 227 is shown as a period Y. A period of rotating developer 99M while supplying magenta toner from developer 99M to photosensitive body 227 is shown as a period M. A period of rotating a developer 99C while supplying cyan toner from developer 99C to photosensitive body 227 is shown as a period C. A period of rotating developer 99K while supplying black toner from developer 99K to photosensitive body 227 is shown as a period K. Region V11 corresponds to period Y, region V12 to period M, region V13 to period C, and region V14 to period K. Note that a period corresponding to one-fourth of a rotation of developing rack 99 actually exists between each of periods Y, M, C, and K, but the period is omitted in FIG. 15.

As is understood from FIG. 22, the load of developer drive motor 990 includes values outside region V12 and values outside region V13 in period M and period C, respectively. That is, in period M, since the load torque is extremely low, it is determined that developer 99M is not attached. In period C, since the load torque is low, it is determined that cyan toner has run out. Accordingly, controller 201 causes display 203 to display error messages for developer 99M and developer 99C. That is, controller 201 causes display 203 to display an error message for a developer, among developers 99Y, 99M, 99C, and 99K, corresponding to a region from which the load value of developer drive motor 990 runs off, among regions V11 to V14. Regarding the motor (developing rack motor 99A) that performs one-fourth rotation of developing rack 99 existing between each of the periods Y, M, C, and K, the ideal load can be similarly compared with the actual load. In this case, for example, if any one of the developers is unattached, the unattached developer can be detected before it moves to a position corresponding to photosensitive body 227 (position at which developer 99Y exists in FIG. 18) and is driven.

Note that the display of an error message based on the load of developer drive motor 990 in this way may be made, e.g., at the time of instructing execution of a printing process and before performing printing operations, and may also be made at the time when printing operations are not performed and an instruction of executing a printing process is not provided.

The target of the display of an error message in the present embodiment may be the states of the rollers that convey a sheet of paper from a paper feed cassette 241 to paper ejection tray 252 in printing operations (a conveying roller 242, secondary transfer roller 243, heating roller 295, pressure roller 294, and paper ejection roller 251). The display of an error message in such a case will be described below.

Figure 23:
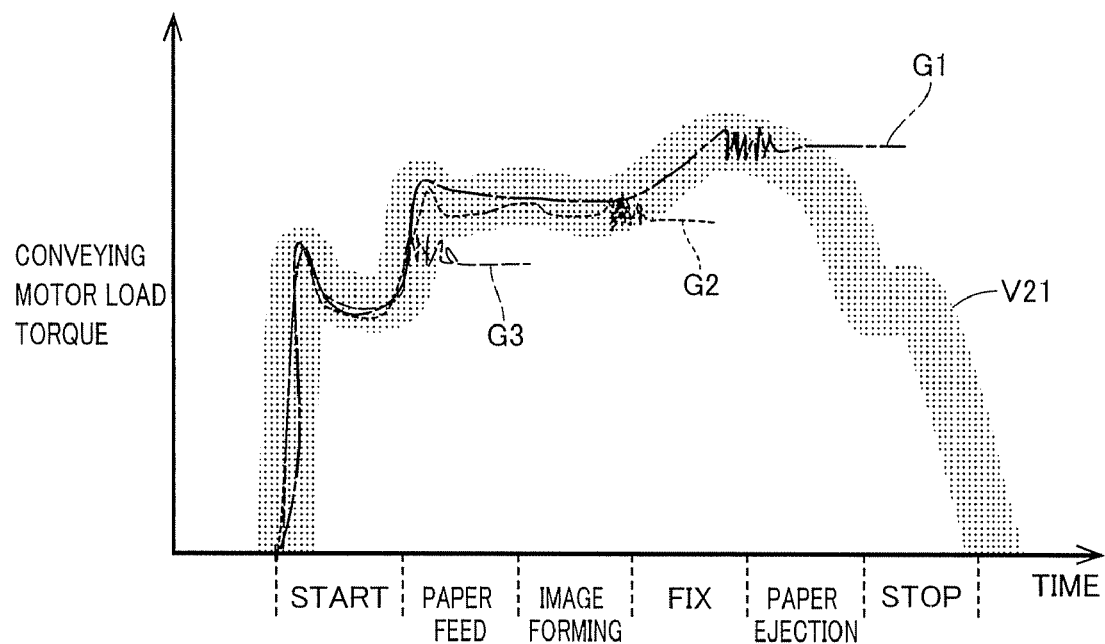
FIG. 23 shows values concerning the load of a conveying motor, which values are stored in the memory of the color printer according to the third embodiment.

Shown in FIG. 23 is an example of region V21 with ideal values of the load of a conveying motor and changes in the load of the stepping motor that drives the conveying roller, which are shown in graphs G1, G2, and G3, for a period of conveying a sheet of paper from paper feed cassette 241 to paper ejection tray 252. Graphs G1, G2, and G3 are graphs each separately obtained when printing operations are actually performed.

Note that, in FIG. 23, six kinds of periods, "START", "PAPER FEED", "IMAGE FORMING", "FIX", "PAPER EJECTION", and "STOP" are defined with respect to time in an abscissa axis. "START" corresponds to a period from the time when power supply is started to the motor to the time when the motor actually starts driving of the roller "PAPER FEED" corresponds to a period from the time when a sheet of paper leaves paper feed cassette 241 to the time when the rear edge of the sheet of paper passes through conveying roller 242. "MAGE FORMING" corresponds to a period from the time when the rear edge of the sheet of paper passes through conveying roller 242 to the time when it passes through secondary transfer roller 243 "FIX" corresponds to a period from the time when the rear edge of the sheet of paper passes through secondary transfer roller 243 to the time when it passes through the nip part between pressure roller 294 and heating roller 295 of fixing device 244. "PAPER EJECTION" corresponds to a period from the time when the rear edge of the sheet of paper passes through the nip part to the time when it passes through paper ejection roller 251. "STOP" corresponds to a period from the time when power supply to the stepping motor is stopped to the time when the rotation of the roller stops.

In FIG. 23, graph G1 runs off region V21 for the first time during the period of "PAPER EJECTION", Graph G2 runs off region V21 for the first time during the period of "FIX". Graph G3 runs off region V21 for the first time during the period of "PAPER FEED".

Controller 201 causes display 203 to display an error message corresponding to the period in which each graph runs off region V21 for the first time. That is, controller 201 causes display 203 to display an error message to the effect of occurrence of jamming in paper feed cassette 241 if the period in which the graph runs off region V21 for the first time is "PAPER FEED", and an error message to the effect of occurrence of jamming in secondary transfer roller 243 if the period is "IMAGE FORMING". If the period is "FIX", it is determined that jamming has occurred in fixing device 244, and therefore controller 201 stops conveying operations, and causes display 203 to display an error message as such. Controller 201 causes display 203 to display an error message to the effect of occurrence of jamming in paper discharge roller 251 if the period is "PAPER EJECTION".

In the embodiments described above, a controlling part controlling a display is constituted by controller 100 or 201.

In all the embodiments described above, an apparatus utilizing an intermediate transfer member (intermediate transfer belt) is exemplified. However, an apparatus that performs transfer directly onto a sheet of paper by means of a photosensitive body may be an embodiment of the present invention just as the above embodiments.

From the above description, preferably, in the image forming apparatus according to one aspect of the present invention, the controller includes a determining part performing the determination, and the determining part includes an inflection point detecting part detecting an inflection point from a rising area of a voltage waveform by using a voltage value detected in the detector; and an excessiveness determination part determining, by comparing a position of the inflection point in the rising area of the voltage waveform with an aim position being the threshold, whether an output of the stepping motor driven by the first current value is excessive for the load torque required for driving the stepping motor.

More preferably, the inflection point detector includes a setting part setting a linear function passing through a rising point of the voltage waveform, and compares the detected voltage with the linear function to detect the inflection point.

Preferably, the detector includes a sampling part sampling the voltage in a rising area of the voltage waveform, and the controller includes an operating part calculating the second current value, a difference calculating part calculating a difference between a maximum and a minimum of a voltage value at a plurality of ones of the inflection point obtained by performing sampling a plurality of times in the detector, and the memory further stores a threshold for determining whether the difference is within a predetermined range, and a coefficient used in the operating part when it is determined that the difference is outside the predetermined range by comparing the calculated difference with the threshold.

More preferably, the coefficient is determined in accordance with the calculated difference.

Preferably, the controller compares the second current value with an upper limit set in advance, and changes the first current value to the second current value when the second current value is inside of the upper limit.

Preferably, the image forming apparatus further includes a control signal outputting part comparing the second current value with an upper limit set in advance and outputting a control signal for stopping driving of the stepping motor when the second current value exceeds the upper limit.

Preferably, the image forming apparatus according to another aspect of the present invention further includes a detector detecting a voltage value corresponding to a current value supplied to the stepping motor, and the controller calculates a load for driving the member of the stepping motor, based on a change of the voltage value detected by the detector.

Preferably, in the image forming apparatus as mentioned above, the controller calculates the load based on a current value of an inflection point in a rising area in the drive current waveform for the stepping motor.

Preferably, the image forming apparatus as mentioned above further includes an image formation part forming an image on a sheet of paper by transferring a developing agent onto the sheet of paper, and a fixer pinching and conveying the sheet of paper having the developing agent transferred thereon, and fixing the image on the sheet of paper having the transferred developing agent, and the member is a roller pinching and conveying the sheet of paper having the transferred developing agent in the fixer.

Preferably, the image forming apparatus as mentioned above further includes a display displaying information; and the controller performs supply of power to the stepping motor, calculation of the load, and control of the display based on the result of comparison, during a period without execution of an image formation operation in the image formation part.

Preferably, the image forming apparatus as mentioned above further includes an intermediate transfer member, and the member is a developer for transferring a developing agent onto the sheet of paper.

Preferably, in the image forming apparatus as mentioned above, the developer is configured to allow a cartridge containing a developing agent to be attached thereto; and the memory stores an upper limit and a lower limit regarding the load of the stepping motor; and the controller causes the display to display first information when the load of the stepping motor is not less than the upper limit and to display second information different from the first information when the load of the stepping motor is not more than the lower limit.

Preferably, in the image forming apparatus as mentioned above, the member is a roller pinching and conveying a sheet of paper on which an image is formed.

Preferably, the image forming apparatus as mentioned above further includes a display displaying information, a paper feed cassette containing the sheet of paper, and a paper ejection roller ejecting a sheet of paper having an image formed thereon to the outside of the image forming apparatus; and the memory stores information on the load of the stepping motor corresponding to the sheet of paper ejected from the paper feed cassette through the paper ejection roller to the outside of the image forming apparatus, and the controller calculates a load of the stepping motor while the sheet of paper is ejecteded from the paper feed cassette through the paper ejection roller to the outside of the image forming apparatus, and controls the display based on a result of comparison of the calculated load with the information stored in the memory.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a stepping motor;
   a motor driver circuit supplying a current to said stepping motor up to a first current value to drive said stepping motor;
   a detector detecting from said motor driver circuit a voltage corresponding to the current supplied to said stepping motor;
   a memory storing a threshold used for performing, based on a change of said voltage, determination of a relational type between a load torque required for driving said stepping motor and an output of said stepping motor to be driven with said first current value; and
   a controller changing said first current value to a second current value calculated as a result of performing said determination using said threshold.

2. The image forming apparatus according to claim 1, wherein said controller includes a determining part performing said determination, said determining part including:
   an inflection point detecting part detecting an inflection point from a rising area of a voltage waveform by using a voltage value detected in said detector; and
   an excessiveness determination part determining, by comparing a position of said inflection point in the rising area of said voltage waveform with an aim position being said threshold, whether an output of said stepping motor driven by said first current value is excessive for the load torque required for driving said stepping motor.

3. The image forming apparatus according to claim 2, wherein said inflection point detecting part includes a setting part setting a linear function passing through a rising point of said voltage waveform, and compares said voltage with said linear function to detect said inflection point.

4. The image forming apparatus according to claim 1, wherein said detector includes a sampling part sampling said voltage in a rising area of said voltage waveform, and said controller includes:
   an operating part calculating said second current value; and
   a difference calculating part calculating a difference between a maximum and a minimum of a voltage value at a plurality of ones of said inflection point obtained by performing sampling a plurality of times in said detector, and
   said memory further stores a threshold for determining whether said difference is within a predetermined range, and a coefficient used in said operating part when it is determined that said difference is outside said predetermined range by comparing said difference with said threshold.

5. The image forming apparatus according to claim 4, wherein said coefficient is determined in accordance with said difference.

6. The image forming apparatus according to claim 1, wherein said controller compares said second current value with an upper limit set in advance, and changes said first current value to said second current value when said second current value is inside of said upper limit.

7. The image forming apparatus according to claim 1, further comprising a control signal outputting part comparing said second current value with an upper limit set in advance and outputting a control signal for stopping driving of said stepping motor when said second current value exceeds said upper limit.

8. An image forming apparatus forming an image on a sheet of paper, comprising:
   a member driven when forming an image;
   a stepping motor driving said member;
   a controller controlling supply of power for driving said member to said stepping motor;
   a memory storing information on a load of said stepping motor; and
   a display displaying information, wherein
   said controller supplies power to said stepping motor for driving said member,
   calculates a load for driving said member of said stepping motor based on a drive current waveform for said stepping motor, and
   controls said display based on a result of comparison of said calculated load with information stored in said memory.

9. The image forming apparatus according to claim 8, further comprising a detector detecting a voltage value corresponding to a current value supplied to said stepping motor, wherein said controller calculates a load for driving said member of said stepping motor, based on a change of said voltage value detected by said detector.

10. The image forming apparatus according to claim 8, wherein said controller calculates said load based on a current value of an inflection point in a rising area in said drive current waveform for said stepping motor.

11. The image forming apparatus according to claim 8, further comprising:
   an image formation part forming an image on a sheet of paper by transferring a developing agent onto said sheet of paper; and
   a fixer pinching and conveying said sheet of paper having the developing agent transferred thereon, and fixing said image on said sheet of paper having the transferred developing agent, wherein
   said member is a roller pinching and conveying said sheet of paper having the transferred developing agent in said fixer.

12. The image forming apparatus according to claim 11, wherein said controller performs supply of power to said stepping motor, calculation of said load, and control of said display based on said result of comparison, during a period without execution of an image formation operation in said image formation part.

13. The image forming apparatus according to claim 8, further comprising an intermediate transfer member, wherein said member is a developer for transferring a developing agent onto one of said sheet of paper and said intermediate transfer member.

14. The image forming apparatus according to claim 13, wherein
   said developer is configured to allow a cartridge containing a developing agent to be attached thereto,
   said memory stores an upper limit and a lower limit regarding the load of said stepping motor, and
   said controller causes said display to display first information when the load of said stepping motor is not less than said upper limit and to display second information different from said first information when the load of said stepping motor is not more than said lower limit.

15. The image forming apparatus according to claim 8, wherein said member is a roller pinching and conveying a sheet of paper on which an image is formed.

16. The image forming apparatus according to claim 15, further comprising:
   a paper feed cassette containing said sheet of paper; and
   a paper ejection roller ejecting a sheet of paper having an image formed thereon to the outside of said image forming apparatus, wherein
   said memory stores information on the load of said stepping motor corresponding to the sheet of paper ejected from said paper feed cassette through said paper ejection roller to the outside of said image forming apparatus, and said controller calculates a load of said stepping motor while the sheet of paper is ejected from said paper feed cassette through said paper ejection roller to the outside of said image forming apparatus, and controls said display based on a result of comparison of the calculated load with the information stored in said memory.

17. An image forming apparatus forming an image on a sheet of paper, comprising:
a member driven at the time of forming an image;
a stepping motor for driving said member;
a controller controlling supply of power for driving said member to said stepping motor; and
a memory storing information on a load of said stepping motor, wherein
said controller supplies power to said stepping motor for driving said member,
calculates a load for driving said member of said stepping motor based on a drive current waveform for said stepping motor, and
determines a state of said member based on a result of comparison of said calculated load with information stored in said memory.

18. The image forming apparatus according to claim 17, further comprising a detector detecting a voltage value corresponding to a current value supplied to said stepping motor, wherein said controller calculates a load for driving said member of said stepping motor, based on a change of said voltage value detected by said detector.

19. The image forming apparatus according to claim 17, wherein said controller calculates said load based on a current value of an inflection point in a rising area in said drive current waveform for said stepping motor.

20. The image forming apparatus according to claim 17, further comprising:
an image formation part forming an image on a sheet of paper by transferring a developing agent onto the sheet of paper; and
a fixer pinching and conveying the sheet of paper having the developing agent transferred thereon, and fixing the image on the sheet of paper having the developing agent transferred thereon, wherein
said member is a roller pinching and conveying the sheet of paper having the developing agent transferred thereon in said fixer.

21. The image forming apparatus according to claim 20, further comprising a display displaying information, wherein
said controller performs supply of power to said stepping motor, calculation of said load, and control of said display based on said result of comparison during a period without execution of an image formation operation in said image formation part.

22. The image forming apparatus according to claim 17, further comprising an intermediate transfer member, wherein
said member is a developer for transferring a developing agent onto one of the sheet of paper and said intermediate transfer member.

23. The image forming apparatus according to claim 22, wherein
said developer is configured to allow a cartridge containing a developing agent to be attached thereto,
said memory stores an upper limit and a lower limit regarding the load of said stepping motor, and
said controller causes said display to display first information when the load of said stepping motor is not less than said upper limit and to display second information different from said first information when the load of said stepping motor is not more than said lower limit.

24. The image forming apparatus according to claim 17, wherein said member is a roller pinching and conveying a sheet of paper on which an image is formed.

25. The image forming apparatus according to claim 24, further comprising:
a display displaying information;
a paper feed cassette containing said sheet of paper; and
a paper ejection roller ejecting a sheet of paper having an image formed thereon to the outside of said image forming apparatus, wherein
said memory stores information on the load of said stepping motor corresponding to the sheet of paper ejected from said paper feed cassette through said paper ejection roller to the outside of said image forming apparatus, and
said controller calculates a load of said stepping motor while the sheet of paper is ejected from said paper feed cassette through said paper ejection roller to the outside of said image forming apparatus, and controls said display based on a result of comparison of the calculated load with the information stored in said memory.

* * * * *